US008786745B2

(12) United States Patent
Kawahito et al.

(10) Patent No.: US 8,786,745 B2
(45) Date of Patent: Jul. 22, 2014

(54) SOLID-STATE IMAGE PICKUP DEVICE

(75) Inventors: Shoji Kawahito, Hamamatsu (JP); Keita Yasutomi, Hamamatsu (JP)

(73) Assignee: National University Corporation Shizuoka University (JP)

(*) Notice: Subject to any disclaimer, the term of this patent is extended or adjusted under 35 U.S.C. 154(b) by 16 days.

(21) Appl. No.: 13/577,162

(22) PCT Filed: Jan. 28, 2011

(86) PCT No.: PCT/JP2011/051813
§ 371 (c)(1),
(2), (4) Date: Oct. 5, 2012

(87) PCT Pub. No.: WO2011/096340
PCT Pub. Date: Aug. 11, 2011

(65) Prior Publication Data
US 2013/0044247 A1 Feb. 21, 2013

(30) Foreign Application Priority Data

Feb. 5, 2010 (JP) ............................... P2010-024595

(51) Int. Cl.
*H04N 5/335* (2011.01)
*H04N 3/14* (2006.01)
*H01L 31/062* (2012.01)

(52) U.S. Cl.
USPC ........... 348/296; 348/302; 348/308; 257/292; 257/294; 257/235; 250/208.1; 250/214 R

(58) Field of Classification Search
CPC ........ H04N 5/335; H04N 3/14; H01L 31/062; H01L 27/148; H01L 29/66; H01L 27/00; G01J 27/00; G01J 1/44
USPC ............... 348/296, 302, 308; 250/208.1, 214, 250/214 R; 257/292, 294, 223, 230, 234, 257/235
See application file for complete search history.

(56) References Cited

U.S. PATENT DOCUMENTS

| 5,986,297 | A | 11/1999 | Guidash et al. |
| 7,361,877 | B2 | 4/2008 | McGrath et al. |
| 2010/0187401 | A1* | 7/2010 | Kawahito ................... 250/208.1 |

FOREIGN PATENT DOCUMENTS

| JP | 2000-253316 | 9/2000 |
| JP | 2002-271686 | 9/2002 |

(Continued)

OTHER PUBLICATIONS

International Search Report dated Feb. 22, 2011 issued in corresponding international application No. PCT/JP2011/051813.

(Continued)

*Primary Examiner* — Tuan Ho
*Assistant Examiner* — Marly Camargo
(74) *Attorney, Agent, or Firm* — Ostrolenk Faber LLP

(57) ABSTRACT

In a pixel 11, a floating semiconductor region FD accumulates a charge from a photoelectric transducer PD. A first charge transfer path CTP1 extends from the photoelectric transducer PD to the floating semiconductor region FD through the storage diode SD. A second charge transfer path CTP2 extends from the photoelectric transducer PD to the floating semiconductor region. An output unit AMP provides a signal corresponding to a potential in the floating semiconductor region FD. The first charge transfer path CTP includes a first shutter switch TR(GS1) for controlling a transfer of the charge from the photoelectric transducer PD, the storage diode SD for accumulating the charge from the photoelectric transducer PD, and a transfer switch TR(TF1) for controlling a transfer of the charge from the storage diode SD to the floating semiconductor region PD, while the second charge transfer path CTP includes a shutter switch TR(GS2) for controlling a transfer of the charge from the photoelectric transducer PD.

2 Claims, 14 Drawing Sheets

(56) References Cited

FOREIGN PATENT DOCUMENTS

| | | |
|---|---|---|
| JP | 2004-111590 | 4/2004 |
| JP | 2008-103647 | 5/2008 |
| JP | 2009-268083 | 11/2009 |
| JP | 2009-296574 | 12/2009 |
| WO | WO 2007/083704 | 7/2007 |
| WO | WO 2008/057527 | 5/2008 |

OTHER PUBLICATIONS

N. Bock, et al. "A Wide-VGA CMOS Image Sensor With Global Shutter and Extended Dynamic Range", IEEEWorkshop on Charge Coupled Devices and Advanced Image Sensors, pp. 222-225, Jun. 2005.

Takayoshi Yamada et al., "A 140dB-Dynamic-Range MOS Image Sensor With In-Pixel Multiple-Exposure Synthesis", IEEE International Solid-State Circuits Conference, pp. 50-51, 594, Feb. 2008.

EPO Form 1507S—Supplementary European Search Report dated Aug. 23, 2013 corresponding to Application No. 11739689.5 (7 pages).

International Preliminary Report on Patentability issued Oct. 11, 2012 in counterpart PCT Application PCT/JP2011/051813.

* cited by examiner

Fig.7

| Parameter | | Value |
|---|---|---|
| Effective pixels | | 600(H) × 480(V) |
| Pixel size | | 7.5μm × 7.5 μm |
| Frame rate (Single shutter mode / Dual shutter mode) | | 120fps / 60 fps |
| Fill factor (without microlens) | | 25 % |
| Sensitivity | | 8.0 V/lux·s |
| Conversion Gain | | 38 uV/e- |
| Dynamic Range (Single global shutter) | | 57 dB |
| Dynamic Range (Dual global shutter) | | 92 dB |
| Full Well Capacity (Linearity) | | 10000 e- (<1%) |
| | | 14000 e- (<2%) |
| Temporal noise (Analog Gain 15x/ 1x) | SD memory signal | 2.7 e-$_{rms}$ / 14.3 e-$_{rms}$ |
| | FD memory signal | 32.8 e-$_{rms}$ / 35.7 e-$_{rms}$ |
| Shutter efficiency | SD memory signal | 99.7 % |
| | FD memory signal | 99.9 % |
| Mean dark current @ 27°C | SD memory signal | 119 e-/s |
| | FD memory signal | 1221 e-/s |

Fig.12
(a)
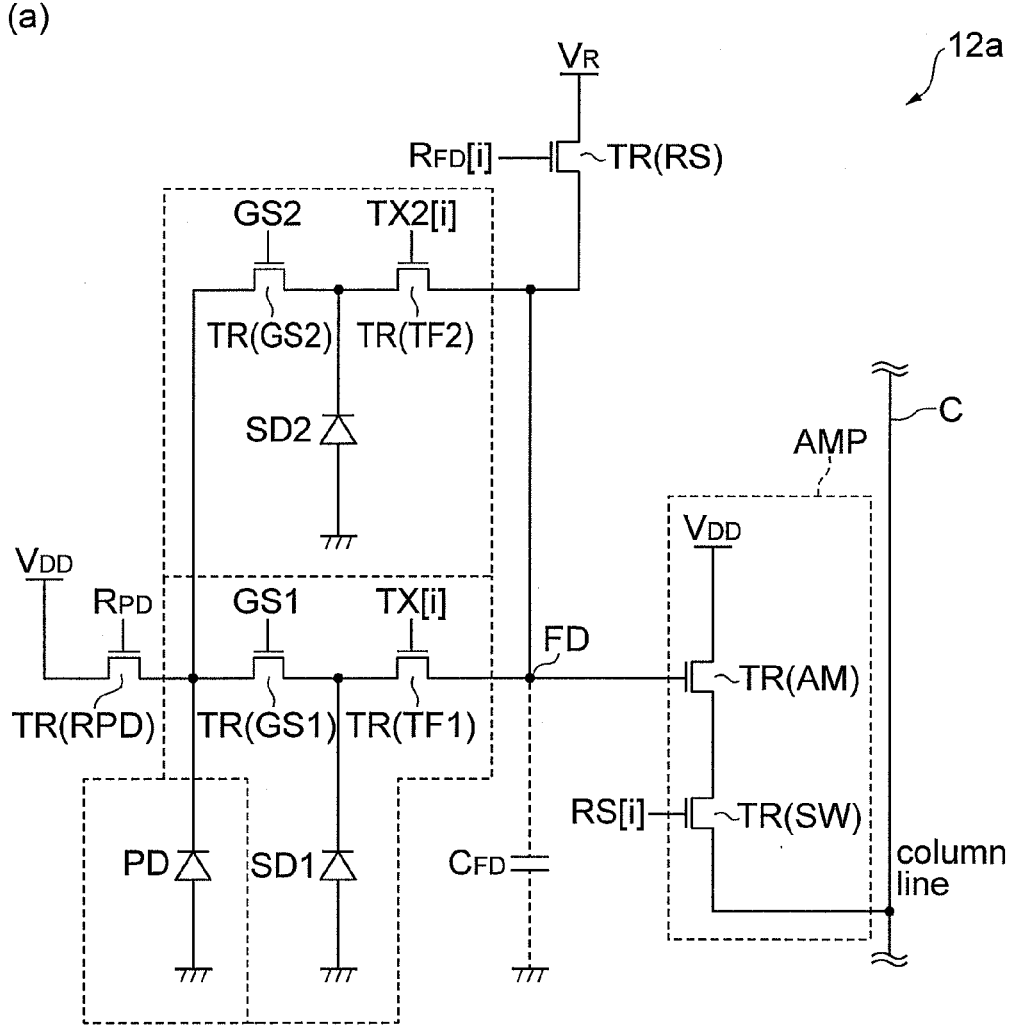
(b)
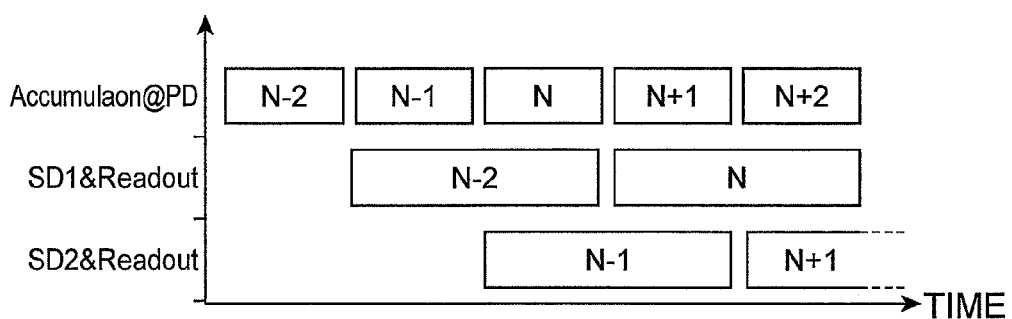

SOLID-STATE IMAGE PICKUP DEVICE

CROSS REFERENCE TO RELATED APPLICATIONS

The present application is a 35 U.S.C. §371 National Phase conversion of PCT/JP2011/051813, filed Jan. 28, 2011, which claims benefit of Japanese Application No. 2010-024595, filed Feb. 5, 2010, the disclosures of which are incorporated herein by reference. The PCT International Application was published in the Japanese language.

TECHNICAL FIELD

The present invention relates to a solid-state image pickup device, a method of reading a pixel signal, and a pixel.

BACKGROUND ART

The image sensor of Patent Literature 1 functions to serve as a global (all-pixel simultaneous) electronic shutter and eliminate reset noise. The image sensor having the all-pixel simultaneous electronic shutter function uses a CCD structure in a part thereof. It also provides a low dark current by using an embedded CMOS capacitor in order to hold charges.

Patent Literatures 2 and 3 disclose CMOS image sensors. These image sensors use an embedded storage diode in order to hold charges without using the CCD structure. In such a CMOS image sensor, charges are shared between two diodes, i.e., a photodiode and a storage diode, by controlling a shutter gate. Sharing the charges provides an electronic shutter operation by using an action in which a part of the charges generated in the photodiode migrate to the storage diode. A pixel for a CMOS image sensor disclosed in Patent Literature 4 has a photodetector region arranged symmetrically about its center.

A MOS image sensor disclosed in Non Patent Literature 1 performs synthesis within a pixel, so as to achieve a piecewise linear wide dynamic range. A MOS image sensor in Non Patent Literature 2 attains a wide dynamic range by combining linear and logarithmic responses.

CITATION LIST

Patent Literature

Patent Literature 1: Japanese Patent Application Laid-Open No. 2004-111590
Patent Literature 2: Japanese Patent Application Laid-Open No. 2008-103647
Patent Literature 3: U.S. Pat. No. 7,361,877
Patent Literature 4: U.S. Pat. No. 5,986,297

Non Patent Literature

Non Patent Literature 1: T. Yamada, S. Kasuga, T. Murata, Y. Kato, "A 140 dB-Dynamic-Range MOS Image Sensor with In-Pixel Multiple-Exposure Synthesis", IEEE International Solid-State Circuits Conference, pp. 50-51, February 2008.
Non Patent Literature 2: N. Bock, A. Krymski, A. Sarwari et al., "A Wide-VGA CMOS Image Sensor with Global Shutter and Extended Dynamic Range," IEEE Workshop on Charge Coupled Devices and Advanced Image Sensors, pp. 222-225, June 2005.

TECHNICAL PROBLEM

The pixel in Patent Literature 3 is required to yield a large difference in depletion potential (potential well) between the two embedded diodes in order to completely transfer charges from the photodiode to the storage diode. For fully enhancing the capacity of charges accumulated in the storage diode, the pixel in Patent Literature 3 uses a high power supply voltage. Charges generated by the photodiode within the pixel are shared between the photodiode and the storage diode, and the charges migrated to the storage diode at this time are utilized, so as to provide the electronic shutter function. As a consequence, a part of charges generated by light remain in the photodiode, and these residual charges exit to a drain. This lowers the sensitivity of the CMOS image sensor.

Patent Literature 2 provides a semiconductor device which can fully transfer signal charges while being producible at low cost and further arranges a plurality of such semiconductor devices as pixels, so as to yield a solid-state image pickup device having a high spatial resolution.

Patent Literature 1 aims to suppress the influence of unnecessary charges generated by blooming and quasi-blooming effects. The pixel in Patent Literature 1 accumulates charges by using only an n-type embedded layer under a gate and thus is required to fully enhance the impurity density in the n-type embedded layer. It further fills the surface of the n-type embedded layer with holes and lowers the dark current by their pinning effect. For this purpose, a large negative voltage is applied to the gate. This becomes a burden on circuits about the pixel array.

While Patent Literature 1 provides a global electronic shutter function in an image sensor utilizing a CCD structure, CMOS image sensors basically have a rolling shutter operation. Therefore, image sensors with the global electronic shutter function are in demand. There have also been strong demands for global electronic shutters and their higher performances in the CMOS image sensors. The present invention has been achieved under such circumstances.

SUMMARY OF THE INVENTION

Objects of the present invention are to provide a solid-state image pickup device which enables multiplexed global shutter operations, a method of reading a pixel signal from a pixel array including a plurality of pixels arranged in an array, and a pixel which enables multiplexed shutter operations.

The solid-state image pickup device in accordance with one aspect of the present invention comprises (a) a pixel array including a plurality of pixels arranged in an array; (b) a control circuit for generating first, second, and third control signals for controlling the pixel; (c) a readout circuit for reading the first and second pixel signals from the pixel array in one frame; and (d) a signal processing unit for processing signals from the readout circuit. A pixel circuit of each pixel includes a photoelectric transducer for generating an electric signal from light received thereby, a floating semiconductor region for accumulating a charge from the photoelectric transducer, a first charge transfer path extending from the photoelectric transducer to the floating semiconductor region, a second charge transfer path extending from the photoelectric transducer to the floating semiconductor region, and an output unit for providing a signal corresponding to a potential in the floating semiconductor region. One of the first and second charge transfer paths includes a first shutter switch for controlling a transfer of the charge from the photoelectric transducer in response to the first control signal, a first storage diode for accumulating the charge from the photoelectric transducer, and a first transfer switch for controlling a transfer of the charge from the first storage diode to the floating semiconductor region in response to the second control signal. The other of the first and second charge transfer paths includes a second shutter switch for controlling a transfer of the charge from the photoelectric transducer in response to the third control signal. The first pixel signal corresponds to a first transfer charge transferred to the floating semiconductor region through the first charge transfer path. The second pixel signal corresponds to a second transfer charge transferred to the floating semiconductor region through the second charge transfer path.

In this solid-state image pickup device, each pixel has the first and second charge transfer paths extending from the photoelectric transducer to the floating semiconductor region, while the first and second charge transfer paths differ from each other. For example, the first and second charge transfer paths include the first and second shutter switches, respectively. In one transfer path, the charge from the photoelectric transducer can temporarily be accumulated in the first storage diode. Therefore, the shutter switches on the individual transfer paths are kept from interfering with each other in terms of transferring charges and thus enable multiplexed global shutter operations in the pixel array.

The output unit in the pixel provides a signal corresponding to the potential in the floating semiconductor region. The output unit provides the first pixel signal in response to the first transfer charge transferred to the floating semiconductor region through the first charge transfer path and the second pixel signal in response to the second transfer charge transferred to the floating semiconductor region through the second charge transfer path. The readout circuit receives the first and second pixel signals separately from each other. The signal processing unit can process the signals from the readout circuit in order to furnish them with higher functions.

Another aspect of the present invention is a method of reading a pixel signal from a pixel array including a plurality of pixels arranged in an array. The method comprises the steps of (a) performing a first charge accumulation in a first accumulation period within a frame period by using a photoelectric transducer in each of the pixels in the pixel array; (b) temporarily accumulating a charge in the first charge accumulation into a first storage diode within a first charge transfer path in the pixel in order to transfer the charge to a floating semiconductor region in the pixel through the first charge transfer path; (c) performing a second charge accumulation in a second accumulation period within the frame period by using the photoelectric transducer; (d) transferring a charge in the second charge accumulation to the floating semiconductor region through a second charge transfer path in the pixel and providing a column line with a pixel signal corresponding to the amount of transferred charge in the floating semiconductor region; (e) reading the pixel signal on the column line; (f) transferring the charge temporarily accumulated in the first storage diode to the floating semiconductor region and providing the column line with a different pixel signal corresponding to the amount of transferred charge in the floating semiconductor region; (g) reading the different pixel signal on the column line; and (h) processing the pixel signal and different pixel signal.

In this method, the pixel performs the first and second charge accumulations in the first and second accumulation periods, respectively, within one frame. The charge in the first charge accumulation is temporarily accumulated in the first storage diode in order to transfer it to the floating semiconductor region. During this accumulation period, the charge in the second charge accumulation is transferred to the floating semiconductor region through the second charge transfer path, while a column line is provided with a second pixel signal representing the potential of the floating semiconductor region corresponding to the amount of thus transferred charge. Thereafter, the charge temporarily accumulated in the first storage diode is transferred to the floating semiconductor region, while the column line is provided with a different pixel signal representing the potential of the floating semiconductor region corresponding to the amount of thus transferred charge. In these transfers, the charge from the photoelectric transducer is temporarily accumulated in the first storage diode during the transfer using one transfer path, and this temporary accumulation is utilized for a transfer of the charge through the other transfer path. Therefore, the first and second charge accumulations are kept from interfering with each other in terms of transferring charges in the first and second accumulation periods and thus enable multiplexed global shutter operations in the pixel array.

This also makes it possible to read respective pixel signals provided on the column line at different times and process thus read signals in order to furnish them with higher functions.

The pixel in accordance with still another aspect of the present invention comprises (a) a photoelectric transducer for generating an electric signal from light received thereby; (b) a floating semiconductor region for accumulating a charge from the photoelectric transducer; (c) a first charge transfer path extending from the photoelectric transducer to the floating semiconductor region; (d) a second charge transfer path, different from the first charge transfer path, extending from the photoelectric transducer to the floating semiconductor region; and (e) an output unit for providing a signal corresponding to a potential in the floating semiconductor region. The first charge transfer path includes a first shutter switch for controlling a transfer of the charge from the photoelectric transducer, a first storage diode for accumulating the charge from the photoelectric transducer, and a first transfer switch for controlling a transfer of the charge from the first storage diode to the floating semiconductor region. The second charge transfer path includes a second shutter switch for controlling a transfer of the charge from the photoelectric transducer. The first shutter switch is connected between the photoelectric transducer and one end of the first storage diode. The first transfer switch is connected between the one end of the first storage diode and the floating semiconductor region. This pixel provides multiplexed shutter operations.

In this aspect of the present invention, the second charge transfer path may include a second storage diode for accumulating the charge from the photoelectric transducer and a second transfer switch for controlling a transfer of the charge from the second storage diode to the floating semiconductor region. The second shutter switch is connected between the photoelectric transducer and one end of the second storage diode. The second transfer switch is connected between the floating semiconductor region and the one end of the second storage diode. This pixel can yield two low-noise pixel signals by using the first and second storage diodes, while providing multiplexed shutter operations. This makes it possible to acquire an accurate difference image and two ultrahigh-speed images even under low illuminance, for example.

As explained in the foregoing, a solid-state image pickup device which enables multiplexed global shutter operations can be provided according to one aspect of the present invention. A method of reading a pixel signal from a pixel array including a plurality of pixels arranged in an array can be provided according to another aspect. A pixel which enables multiplexed shutter operations can be provided according to still another aspect of the present invention.

BRIEF DESCRIPTION OF DRAWINGS

FIG. 7 is a chart illustrating characteristics of a prototype global shutter CMOS image sensor;

FIG. 12 is a diagram illustrating an example of images obtained by utilizing a highly accurate dual shutter;

DESCRIPTION OF EMBODIMENTS

Findings of the present invention will easily be understood in view of the following detailed description with reference to the accompanying drawings given by way of illustration. In the following, embodiments of the solid-state image pickup device, method of reading a pixel signal from a pixel array including a plurality of pixels arranged in an array, and pixel for a solid-state image pickup device enabling multiplexed shutter operations will be explained with reference to the accompanying drawings. The same parts will be referred to with the same signs when possible.

A solid-state image pickup device using a pixel circuit which enables multiplexed shutter operations will now be explained. The solid-state image pickup device comprises pixels having an amplification function and a scan circuit arranged about the pixels and reads pixel data from the pixels by using the scan circuit. An example of the solid-state image pickup device is an image sensor constituted by a CMOS (complementary metal-oxide semiconductor) which is advantageous in integrating pixels with their surrounding drive circuits and signal processing circuits. An example of the pixels in this image sensor includes a transistor having a structure which can achieve a high image quality, a photodiode, and a storage diode. The transistor may be of MIS or MOS type, for example. Using an embedded diode can achieve a low leak current.

Figure 1:
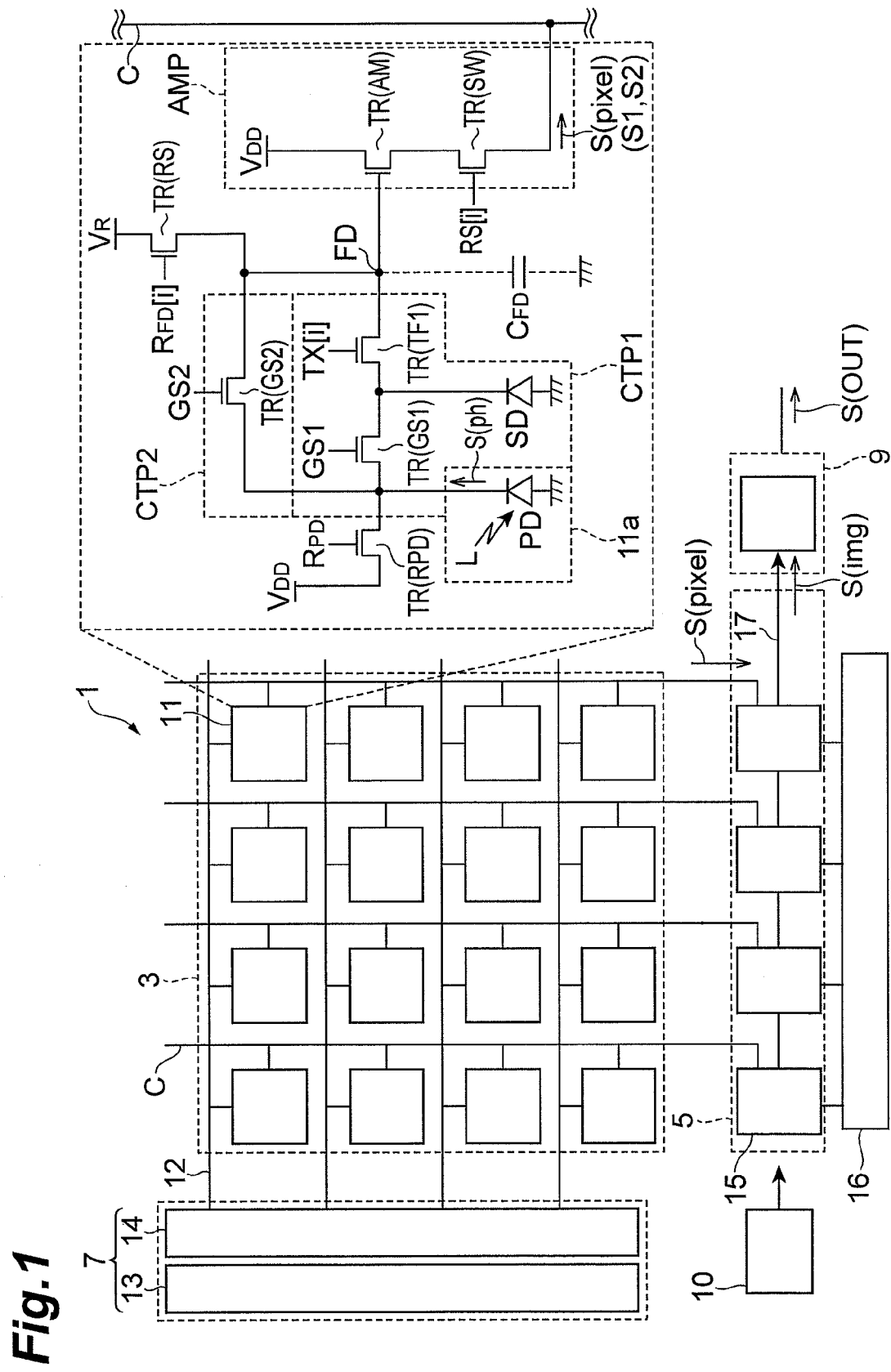
FIG. 1 is a diagram illustrating a block structure of a solid-state image pickup device.

FIG. 1 is a diagram illustrating a block structure of a solid-state image pickup device such as a two-dimensional image sensor. This solid-state image pickup device 1 includes a pixel array 3, a column signal processing unit 5, a control circuit 7, and a signal processing unit 9. In the solid-state image pickup device 1, pixels 11 are arranged in a matrix, so as to construct the pixel array 3. The pixels 11 are connected to a column signal line C and constitute a column arrangement. The control circuit 7 includes a row decoder circuit 13 and a row drive circuit 14. The row decoder circuit 13 selects a specific row from rows of pixels. The row drive circuit 14 provides a drive line 12 with a drive signal. For example, the drive line 12 represents a plurality of shutter switch drive lines (first and second shutter transistor drive lines GS1, GS2 in the pixel circuit of FIG. 1), one or a plurality of transfer switch drive lines (a transfer transistor drive line TX(i) in the pixel circuit of FIG. 1), a reset switch drive line (a reset transistor drive line $R_{FD}(i)$ in the pixel circuit of FIG. 1), a row selection switch drive lines (a row selection transistor drive line RS(i) in the pixel circuit of FIG. 1), and an accumulation time control switch drive line (an accumulation time control transistor drive line $R_{PD}$ in the pixel circuit of FIG. 1). The control circuit 7 may be divided into a plurality of blocks arranged about the pixel array 3. The solid-state image pickup device 1 may include a timing generation circuit 10, which generates control signals, clock signals, and the like for controlling operation timings of circuits included in the device 1.

Figure 2:
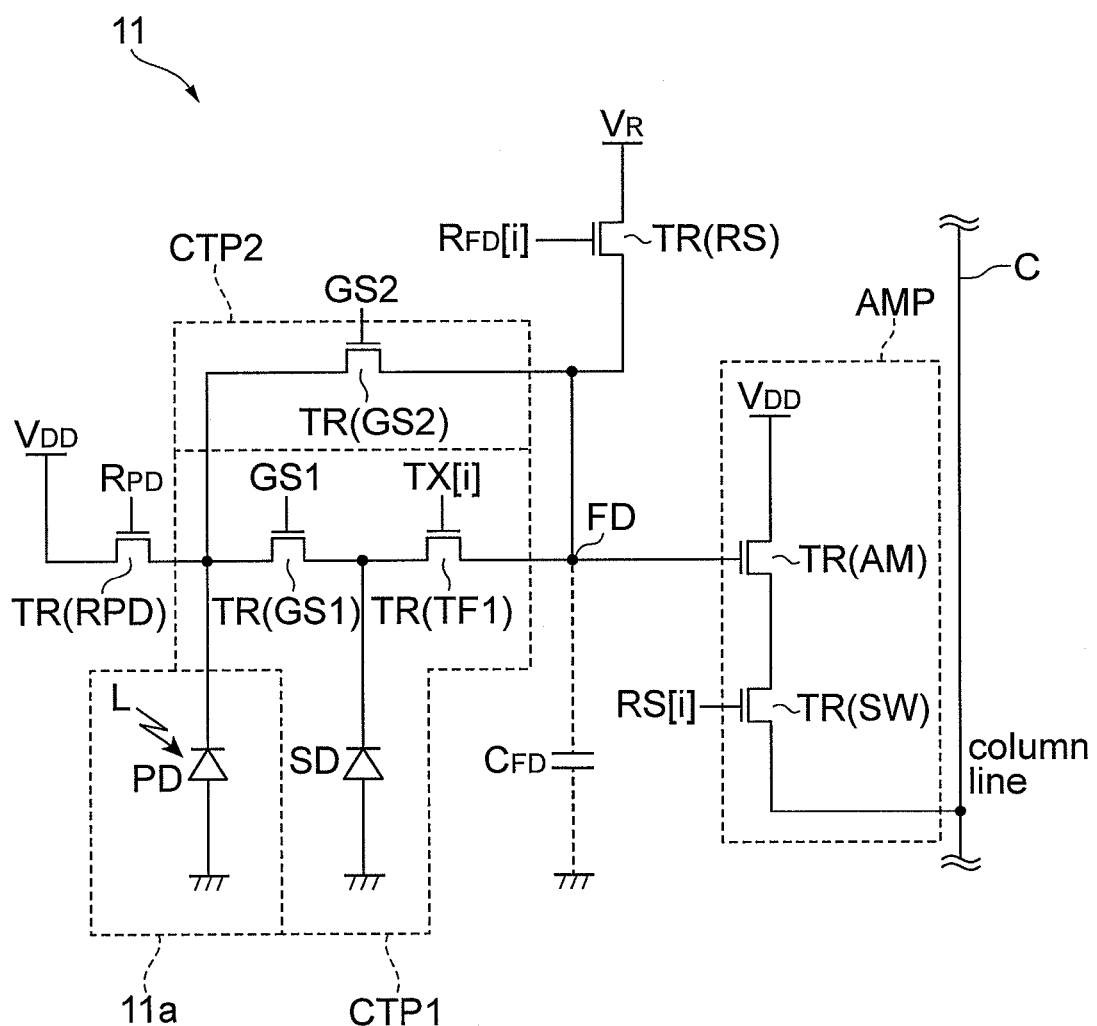
FIG. 2 is a diagram illustrating an example of pixels for the solid-state image pickup device.

Referring to FIGS. 1 and 2, the pixel 11 has a photoelectric transducer 11a and a pixel circuit 11b. The photoelectric transducer 11a may include a photodiode, for example. The photoelectric transducer 11a receives light L and converts it into an electric signal. The pixel circuit 11b amplifies a signal S(ph) from the photoelectric transducer 11a, so as to provide a pixel signal S(pixel). The pixel circuit 11b of the pixel 11 includes a floating semiconductor region FD, a plurality of charge transfer paths (e.g., first and second charge transfer paths CTP1, CTP2), and an output unit AMP. The plurality of charge transfer paths CTP1, CTP2 differ from each other. The floating semiconductor region FD accumulates charges from the photoelectric transducer 11a. The output unit AMP provides a signal corresponding to the potential in the floating semiconductor region FD (the potential held by a depletion layer capacitor $C_{FD}$ of a pn junction). The first and second charge transfer paths CTP1, CTP2 extend from the photoelectric transducer 11a to the floating semiconductor region FD. The first charge transfer path CTP1 includes a first shutter switch TR(GS1) which controls a charge transfer from the photoelectric transducer 11a. The second charge transfer path CTP2 includes a second shutter switch TR(GS2) which controls a charge transfer from the photoelectric transducer 11a. This pixel 11 provides multiplexed shutter operations. In addition to the first shutter switch TR(GS1), the first charge transfer path CTP1 includes a first storage diode SD, which accumulates charges from the photoelectric transducer 11a. Charges generated by the photoelectric transducer 11a are transferred to the floating semiconductor region FD through either the first or second charge transfer path CTP1, CTP2. Since these transfers cannot be performed simultaneously, the first charge transfer path CTP1 includes the storage diode SD for temporarily accumulating the charges from the photoelectric transducer 11a. The first shutter switch TR(GS1) controls the charge transfer from the photoelectric transducer 11a in response to a first control signal GS1. A first transfer switch TR(TF1) controls a charge transfer from the first storage diode SD to the floating semiconductor region FD in response to a second control signal TX(i). The second shutter switch TR(GS2) controls the charge transfer from the photoelectric transducer 11a in response to a third control signal GS2. The control circuit 7 generates the control signals GS1, TX(i), GS2 for controlling the pixel 11, while these control signals are fed to the pixel 11 through the drive line 12. A switch TR(RPD), which is used for defining an exposure time, is connected to one end of the photoelectric transducer 11a.

In this embodiment, the switches in the pixel circuit 11b are constituted by transistors, for example. In the first charge transfer path CTP1, the first shutter switch TR(GS1) is constituted by a transistor and connected between the photoelectric transducer 11a and one end of the first storage diode SD. The first transfer switch TR(TF1) is constituted by a transistor and connected between one end of the first storage diode SD and the floating semiconductor region FD. In the second charge transfer path CTP2, the second shutter switch TR(GS2) is constituted by a transistor and connected between the photoelectric transducer 11a and the floating semiconductor region FD. The gates of these transistors receive their corresponding control signals fed from the control circuit 7 through the drive line 12.

In the pixel 11, a reset transistor TR(RS) is connected to the floating diffusion part FD, so as to reset the latter. In the output unit AMP, an amplification transistor TR(AM), which receives signals from the floating diffusion part FD at its gate, is connected between a reference potential line $V_{DD}$, such as a power supply line, and the column line C. A switch transistor TR(SW) is connected in series with the amplification transistor TR(AM) between the reference potential line $V_{DD}$ and the column line C. The pixel circuit 11b provides the column line C with the pixel signal S(pixel) generated by using a current supply connected to the column line C. One end (e.g., drain) of each of the transistor TR(RPD) and reset transistor TR(RS) is connected to the reference potential line $V_{DD}$.

Referring to FIG. 1 again, the signals on the column line C are fed to the column signal processing unit 5. The column signal processing unit 5 performs predetermined processing for the pixel signal S(pixel), so as to generate an imaging signal S(img). This processing may be at least one of correlated double sampling, AD conversion, amplification, and sample-and-hold operation, which is analog or digital signal processing.

The column signal processing unit 5 includes a readout circuit 15 which reads the first and second pixel signals S1, S2 from the pixel array 3 in one frame. The first pixel signal S1 corresponds to the first transfer charge transferred to the floating semiconductor region FD through the first charge transfer path CTP1. The second pixel signal S2 corresponds to the second transfer charge transferred to the floating semiconductor region FD through the second charge transfer path CTP2.

The signal processing unit 9 receives the signal S(img) from the readout circuit 15. The signal processing unit 9 generates a readout signal S(OUT). In a preferred embodiment, the signal S(img) of the column signal processing unit 5 may be a digital signal having a predetermined digital formation. In an example of the solid-state image pickup device 1, signals of each column are fed to a horizontal signal line 17 by a column decoder circuit 16.

In this solid-state image pickup device 11, the pixel circuit 11b of each pixel 11 has the first and second charge transfer paths CTP1, CTP2 each extending from the photoelectric transducer 11a to the floating semiconductor region FD. For example, the first and second charge transfer paths CTP1, CTP2 include the first and second shutter switches, respectively. In one transfer path, the charge from the photoelectric transducer 11a can temporarily be accumulated in the first storage diode SD. Therefore, the shutter switches TR(GS1), TR(GS2) are kept from interfering with each other in terms of transferring charges and thus enable multiplexed global shutter operations in the pixel array 3. For making the following explanation easier to understand, the above-mentioned reference signs of the switches will be used for their corresponding transistors.

The output unit AMP in the pixel circuit 11b provides the signals S1, S2 corresponding to the potential in the floating semiconductor region FD. The output unit AMP provides the first pixel signal S1 in response to the first transfer charge transferred to the floating semiconductor region FD through the first charge transfer path CTP1 and the second pixel signal S2 in response to the second transfer charge transferred to the floating semiconductor region FD through the second charge transfer path CTP2. The readout circuit 15 receives the first and second pixel signals S1, S2. The signal processing unit 9 processes the signals from the readout circuit 15 in order to furnish them with higher functions.

Figure 3:
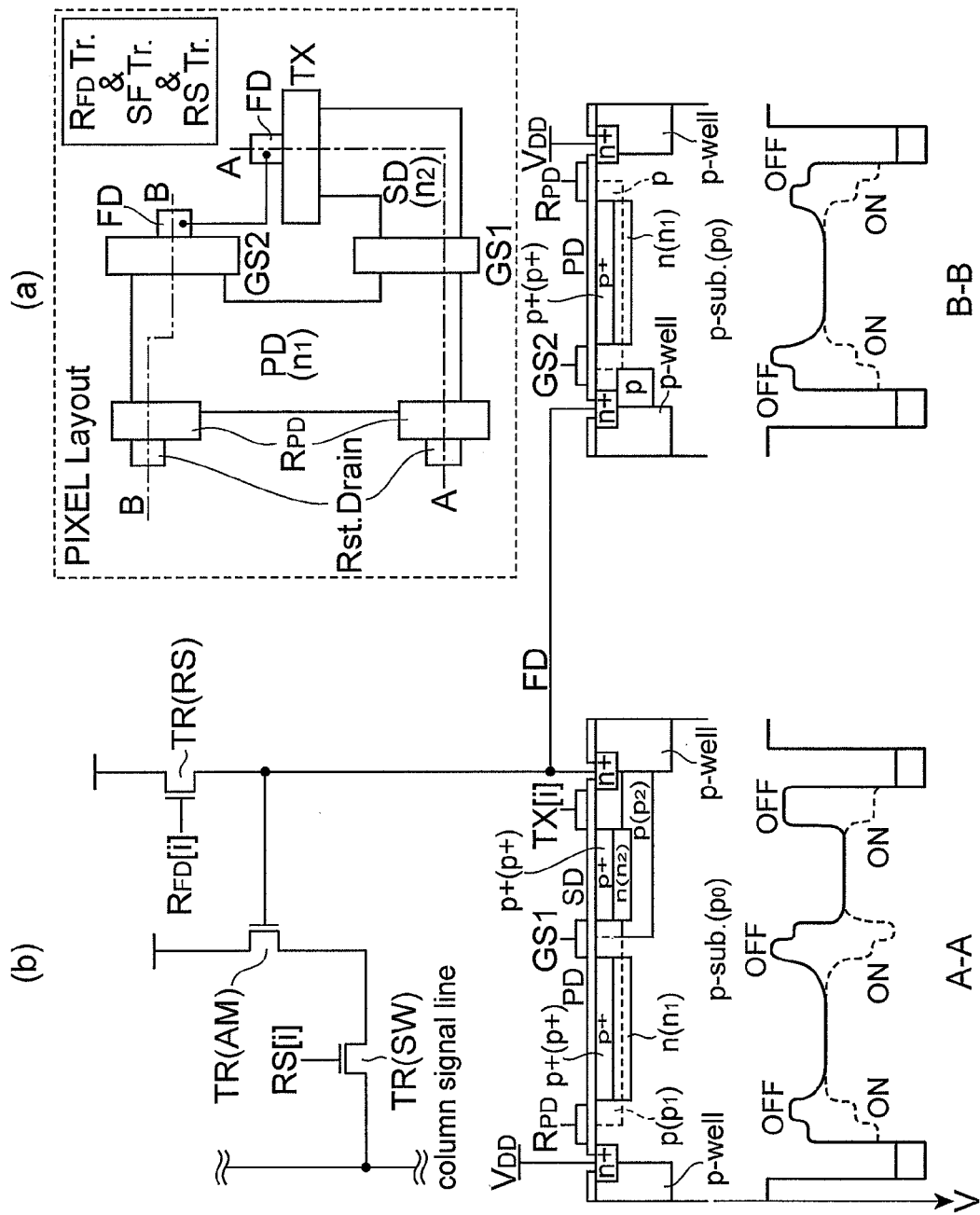
FIG. 3 is a diagram illustrating a device structure of a pixel.

FIG. 3 is a diagram illustrating a device structure of a pixel. Referring to part (a) in FIG. 3, an example of two-dimensional layouts of the pixel 11 is shown. The part (a) of FIG. 3 illustrates transistors other than those in the output unit AMP and the reset transistor as well as two charge transfer paths. Part (b) of FIG. 3 illustrates respective cross sections taken along the lines A-A and B-B shown in the part (a) of FIG. 3. The part (b) of FIG. 3 illustrates potential diagrams of a channel part of transistors of the pixel 11 in the A-A and B-B cross sections, respectively. The potentials in conduction and non-conduction states are represented by solid and broken lines, respectively. In this embodiment, the pixel 11 of the solid-state image pickup device 1 is produced on a p-type substrate. The pixel 11 is formed on a p-type substrate (p-sub).

A photodiode PD includes an n-type semiconductor region (having an n-type dopant concentration n2) disposed within the p-type substrate (having a p-type dopant concentration p0), a $p^+$-type semiconductor region (having a p-type dopant concentration p0) disposed on the front face of the p-type substrate, and a low-concentration p-type semiconductor region (having a p-type dopant concentration p1<p+, p0<p1) disposed on the side and bottom faces of the $p^+$-type semiconductor region. The p-type semiconductor region extends halfway directly under the channel of the two shutter transistors. Therefore, the potential of the channel of the two shutter transistors exhibits stepped forms in the conduction and non-conduction states. The photodiode PD has a pinning structure.

The storage diode SD includes an n-type semiconductor region (having an n-type dopant concentration n2) disposed within the p-type substrate, a $p^+$-type semiconductor region (having a p-type dopant concentration p+) disposed on the front face of the p-type substrate, and a low-concentration p-type semiconductor region (having a p-type dopant concentration p2<p+, p0<p2) disposed on the bottom face of the n-type semiconductor region. The surroundings of the n-type semiconductor region are covered with the p- and $p^+$-type semiconductor regions. The storage diode SD has a pinning structure.

Since the n-type dopant concentration n2 in the n-type semiconductor region of the photodiode FD differs from the n-type dopant concentration n2 in the n-type semiconductor region of the storage diode SD, the charge transfer efficiency can be improved. In the storage diode SD, the low-concentration p-type semiconductor region (p-type dopant concentration p2) can provide low parasitic photo-sensitivity, thereby preventing the charge of the photodiode PD from causing the blooming to the storage diode SD. In a preferred embodiment of the pixel, a low dark current of 119 $e^-$/sec could be achieved at 27° C. in the storage diode.

The floating semiconductor region FD is constituted by an n-type semiconductor, which is formed for the sources and drains of the transistors, in contact with a p-well and the p-type substrate (p-sub).

Figure 4:
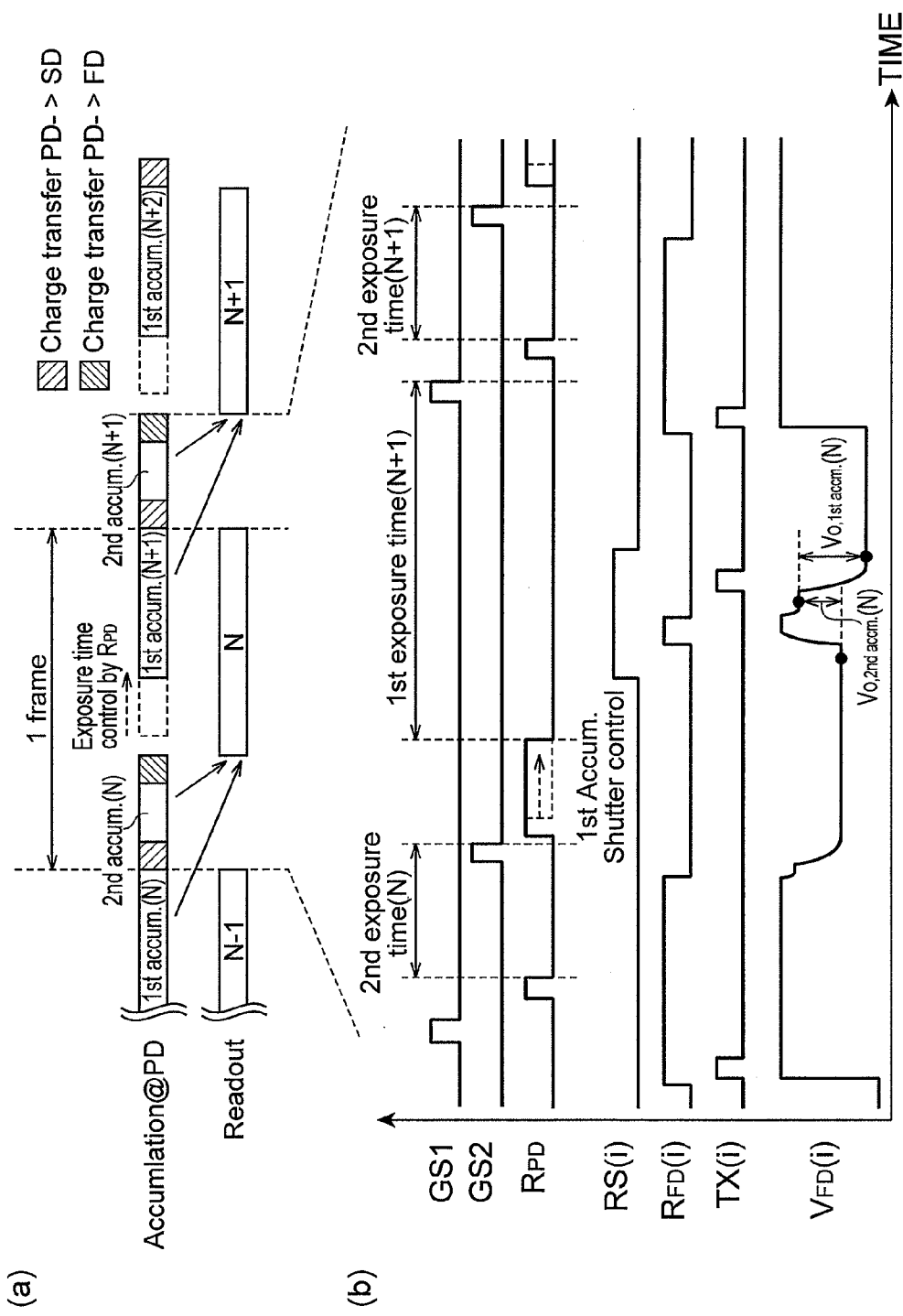
FIG. 4 is a diagram illustrating an example of timings for driving the pixel.

The pixel 11 can provide two operation modes. They are referred to as a dual shutter mode and a single shutter mode. In the single shutter mode, the shutter transistor TR(GS2) is closed, whereby the solid-state image pickup device 1 can provide a low-noise global shutter operation. In the dual shutter mode, both of the storage diode SD and floating semiconductor region FD are used for accumulating charges. This mode can capture two snapshot images in each frame. FIG. 4 is a chart illustrating an example of timings for driving the pixel. Referring to the operation scheme illustrated in part (a) of FIG. 4, the photodiode PD performs a first charge accumulation, and thus accumulated charge is transferred to the storage diode SD through the shutter transistor TR(GS1). Subsequently, the photodiode PD performs a second charge accumulation, and thus accumulated charge is transferred to the floating semiconductor region FD through the shutter transistor TR(GS2). The respective exposure times in these charge accumulations are defined by periods between the falling edge of a control pulse $R_{PD}$ of the transistor TR(RPD) and the falling edges of the control pulses GS1, GS2 of the shutter transistors. A reset operation for controlling the accumulation time in the photodiode PD is performed by the transistor TR(RPD). The readout from the pixel 11 is performed as a background operation during the first charge accumulation in the next frame.

Referring to the operation timing illustrated in part (a) of FIG. 4, a signal stored in the floating diffusion region FD is firstly read in the dual shutter mode. After the readout, the potential of the floating diffusion region FD is reset by the reset transistor TR(RS), so as to generate a rest potential in the floating diffusion region FD. After reading a signal concerning the reset potential, a signal recorded in the storage diode SD is transferred to the floating diffusion region FD through the transfer transistor TR(TF1). Thus transferred signal is read. This action can cancel noises such as kTC noise by utilizing a correlated double sampling (CDS) operation. The dual shutter operation also provides some functions such as wide dynamic range, motion detection, and capture of two consecutive images. The charge accumulation and transfer timings overlap in the part (a) of FIG. 4 but may be kept from overlapping.

Figure 5:
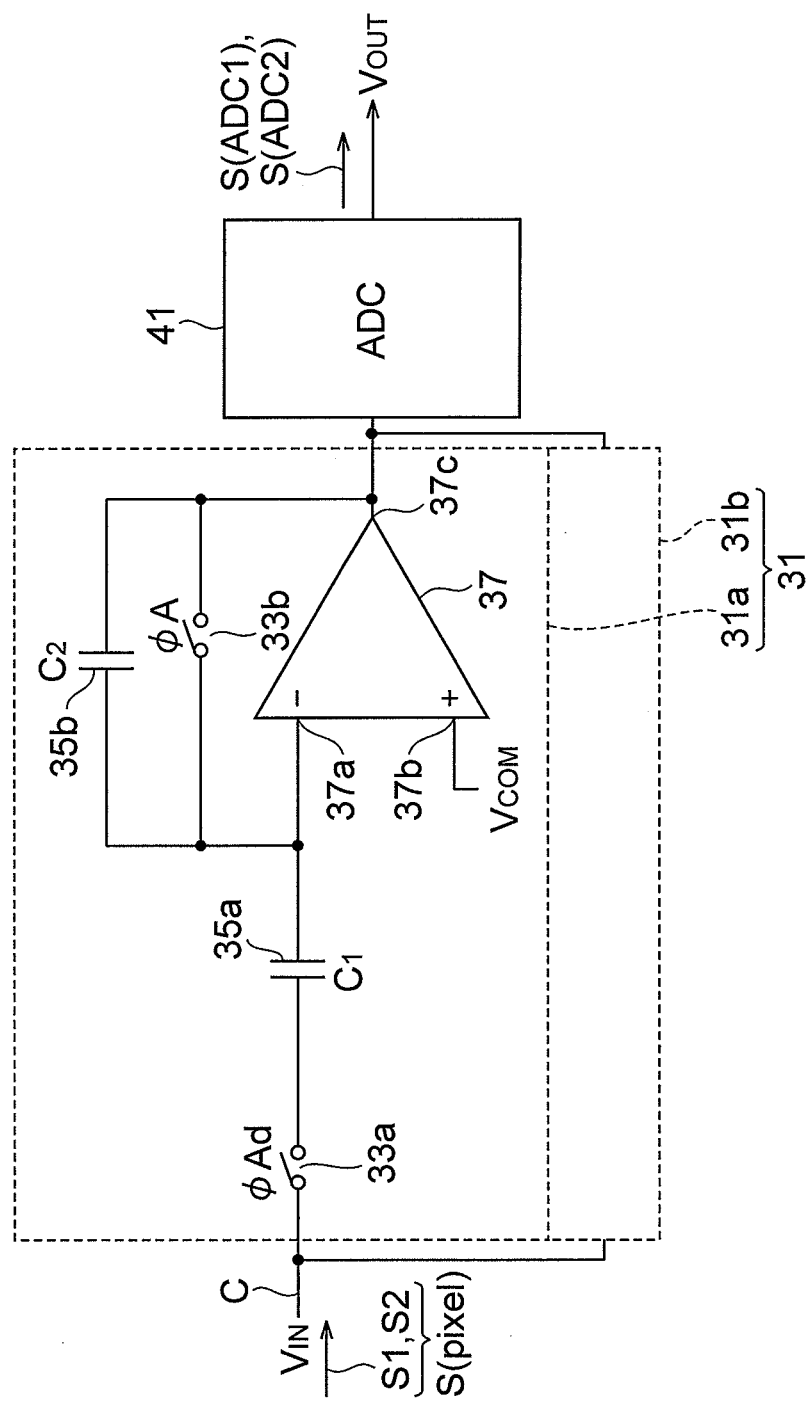
FIG. 5 is a diagram illustrating an example of column signal processing circuits for the solid-state image pickup device in accordance with an embodiment.

FIG. 5 is a diagram illustrating an example of column signal processing circuits for the solid-state image pickup device in accordance with this embodiment. The column signal processing circuit 15 may include one or a plurality of correlated double sampling (referred to as "CDS") units 31. The correlated double sampling unit 31 reads the pixel signals S1, S2. In a preferred embodiment, each of the pixel signals S1, S2 includes reset and signal levels. For processing these signals, the correlated double sampling unit 31 may include first and second CDS circuits 31a, 31b.

Each of the CDS circuits 31a, 31b includes switches 33a, 33b, capacitors 35a, 35b, and an operational amplification circuit 37. One input (negative input) 37a of the operational amplification circuit 37 receives a signal from an input $V_{IN}$ through the switch 33a and capacitor 35a connected in series, while the other input (positive input) 37b of the operational amplification circuit 37 receives a common reference signal ($V_{COM}$). The switch 33b and capacitor 35b are connected in parallel between the one input 37a of the operational amplification circuit 37 and an output 37c thereof. An output $V_{OUT}$ receives a signal from the output 37c of the operational amplification circuit 37. The switches 33a, 33b control a signal input operation and a reset operation, respectively. When the pixel 11 outputs the reset potential, the switches 33a, 33b are closed, so as to fetch the reset level S1 into the capacitor 35a. Subsequently, the switch 33b is opened while keeping the switch 33a closed, so as to fetch the signal level S2 from the pixel 11 into the capacitor 35a. Since the switch 33b is open, a difference between the reset level S1 and the signal level S2 (e.g., S1-S2), i.e., analog CDS result, is generated at the output 37c of the operational amplification circuit 37.

The column signal processing circuit 15 may include an AD conversion circuit 41 in addition to the CDS unit 31. The AD conversion circuit 41 receives a signal from the CDS circuit 31. The AD conversion circuit 41 AD-converts the analog CDS result, so as to generate first and second digital signals (digital imaging signals) S(ADC1), S(ADC2) corresponding to the first and second pixel signals S1, S2, respectively. The type of AD conversion in the AD conversion circuit 41 may be at least one of integrating conversion, cyclic conversion, successive approximation conversion, and their combinations, for example. The solid-state image pickup device 1 may employ any of the conversion types mentioned above. The AD conversion circuit 41 may include one or a plurality of AD converters.

Referring to FIG. 4 again, driving timings and CDS operations will be explained. The first signal charge accumulated in the photodiode PD by the first charge accumulation for driving the pixel 11 is transferred to the storage diode SD through the shutter transistor TR(GS1), and the storage diode SD holds the transferred charge and refers thereto as a first accumulated charge. The first charge accumulation period is a duration from an off time of the transistor TR(RPD) to an off time of the shutter transistor TR(GS1) in the previous frame. Subsequently, a second charge accumulation is performed in the photodiode PD. The secondly accumulated charge is transferred to the floating semiconductor region FD through the shutter transistor TR(GS2), so as to be temporarily held in the floating semiconductor region FD. Thus held charge is referred to as a second accumulated charge. These charge transfers are performed for all the pixels at the same time and thus become global shutter operations together with the first and second accumulated charges.

Signals in the global shutter operations are processed as in the following.

First, a vertical scan circuit selects the pixels 11 row by row. For example, the i-th row is selected, and a signal level VSIG2 ("$V_{SIG,2nd}$" in FIG. 4) of the second accumulated signal held in the floating semiconductor region FD is sampled by the column CDS circuit 31. After sampling the signal level, the floating semiconductor region FD is reset by the reset signal of the i-th row through the reset transistor TR(RS). At this time, a reset noise is superposed on the floating semiconductor region FD. This reset level VRES2 ("$V_{RES,2nd}$" in FIG. 4) is sampled by the column CDS circuit 31a. The column CDS circuit 31a generates a signal representing a difference between the signal level VSIG2 ("$V_{SIG,2nd}$" in FIG. 4) and the reset level VRES2 ("$V_{RES,2nd}$" in FIG. 4). This provides a signal (VSIG2−VRES2; "$V_{o,2nd}=V_{SIG,2nd}-V_{RES,2nd}$" according to the notation in FIG. 4) in which a fixed pattern noise resulting from the pixel is canceled). This sequence does not cancel the reset noise.

Next, after the column CDS circuit 31a reads the reset level VRES2, the floating semiconductor region FD is reset by the reset signal of the i-th row through the reset transistor TR(RS). This reset level VRES1 ("$V_{RES,1st}$" in FIG. 4) is sampled by the column CDS circuit 31b different from the previous one. As explained above, the storage diode SD temporarily holds the first accumulated charge. After the sampling, the first accumulated charge is transferred to the floating semiconductor region FD through the transfer transistor TR(TF1), and its signal level VSIG1 ("$V_{SIG,1st}$" in FIG. 4) is sampled by the column CDS circuit 31b. Then, the column CDS circuit 31b operates, so as to generate the difference between the reset level VRES1 and signal level VSIG1

(VSIG1−VRES1; $V_{o,1st}=V_{RES,1st}-V_{SIG,1st}$), thereby canceling the reset noise and fixed pattern noise.

Performing these procedures yields two image signals, i.e., the FD-held signal concerning the charge directly transferred to the floating semiconductor region FD and the SD-held signal concerning the charge transferred to the floating semiconductor region FD through the storage diode, for each frame. A typical value of the time difference between the two image signals, which can be minimized to the time required for transferring the charge from the photodiode PD to the storage diode SD, is on the order of several μs to several tens of μs, for example. This characteristic feature makes it possible to apply the solid-state image pickup device 1 in accordance with this embodiment to processing for wide dynamic range imaging with a global shutter and linear response, motion detection by a difference image, and ultrahigh-speed capture of two consecutive images and image stabilization.

Figure 6:
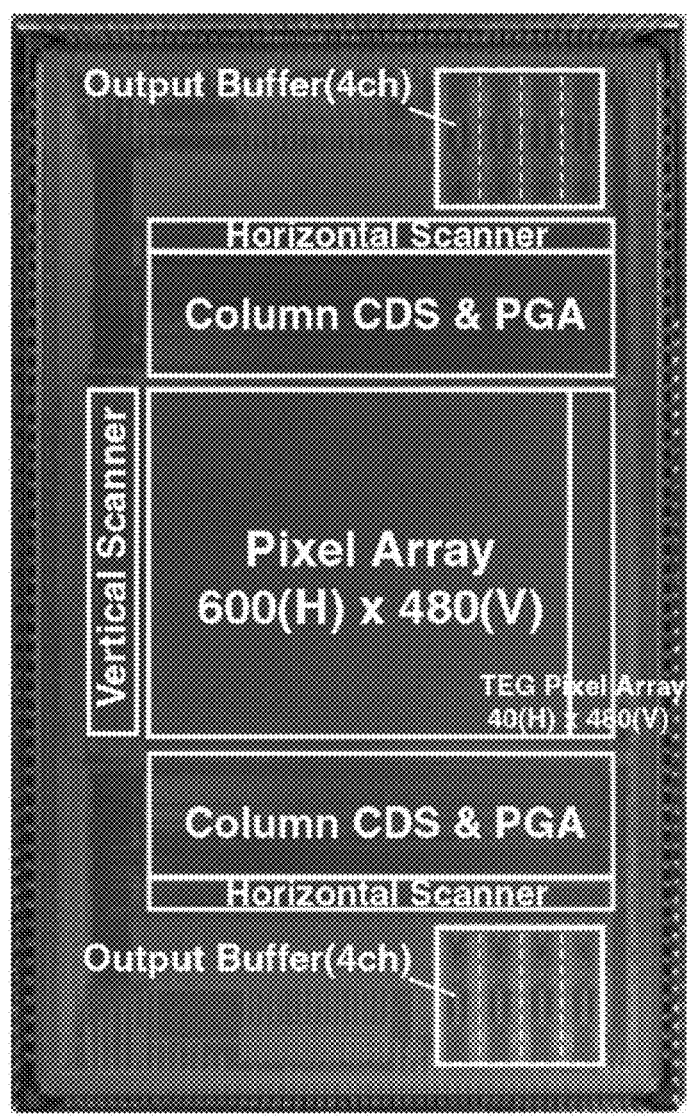
FIG. 6 is a diagram illustrating a semiconductor chip achieving the solid-state image pickup device in accordance with the embodiment as a semiconductor integrated device.

FIG. 6 is a diagram illustrating a semiconductor chip achieving the solid-state image pickup device in accordance with this embodiment as a semiconductor integrated device. FIG. 7 is a chart illustrating characteristics of a prototype global shutter CMOS image sensor. A block arrangement of this prototype global shutter CMOS image sensor is represented. This image sensor has a pixel array including 600× 480 effective pixels each having a size of 7.5 μm×7.5 μm. The pixel array is disposed between column circuit units each including a column CDS circuit and a programmable gain amplifier (PGA). The programmable gain amplifier can change its gain according to signal control and provide a gain of 1× or 15× in this image sensor. In the dual shutter mode, each of the upper and lower column circuit units can read the FD signal concerning the charge directly transferred to the floating semiconductor region FD and the SD signal concerning the charge transferred to the floating semiconductor region FD through the storage diode SD.

Figure 8:
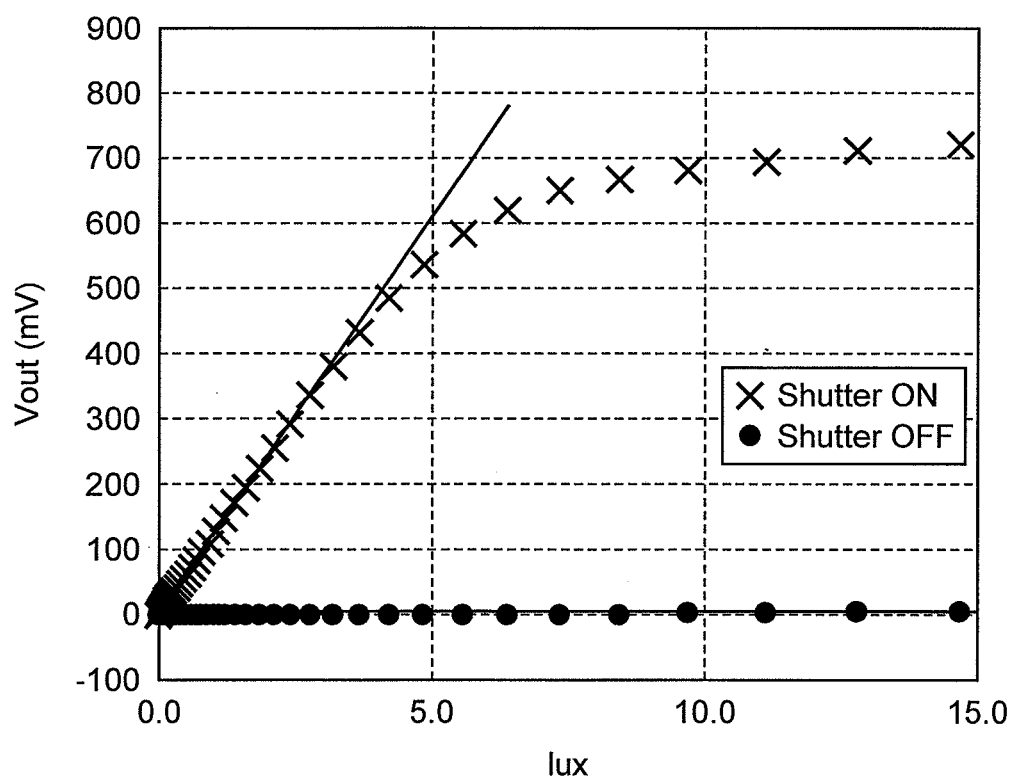
FIG. 8 is a chart illustrating characteristics measured by pixels employed in an image sensor.

FIG. 8 is a chart illustrating characteristics measured by pixels employed in an image sensor. In FIG. 7, the abscissa and ordinate indicate the illuminance (lux) of light irradiating the image sensor and the signal value (mV) obtained from the image sensor, respectively. The measurement represents a (shutter-on) characteristic obtained when the global shutter TR(GS1) was open and a (shutter-off) characteristic obtained when the global shutter TR(GS1) was closed. As for measured values of sensitivity, off and on values were 8.0 V/lux·sec and 0.022 V/lux·sec, respectively. Its parasitic photo-sensitivity was low, i.e., 0.3%, while its shutter efficiency was high, i.e., 99.7%.

When generating the pixel signal (SD signal) using the storage diode, the dark temporal noise was 2.7 e⁻ and 14.3 e⁻ at the gains 1× and 15× of the amplifier PGA, respectively. Such low noises are obtained because of the fact that a full CDS operation can cancel the kTC noise in addition to the fact that noise is low in the operation of the readout circuit. When generating the pixel signal (FD signal) without using the storage diode, the dark temporal noise was 32.8 e⁻ at the gain 15× of the amplifier PGA. This indicates that the kTC noise is dominant in the temporal noise. These measurements indicate that the noise is very low in the pixel of this embodiment, i.e., about one tenth that of a conventional 5 Tr global shutter operation.

Figure 9:
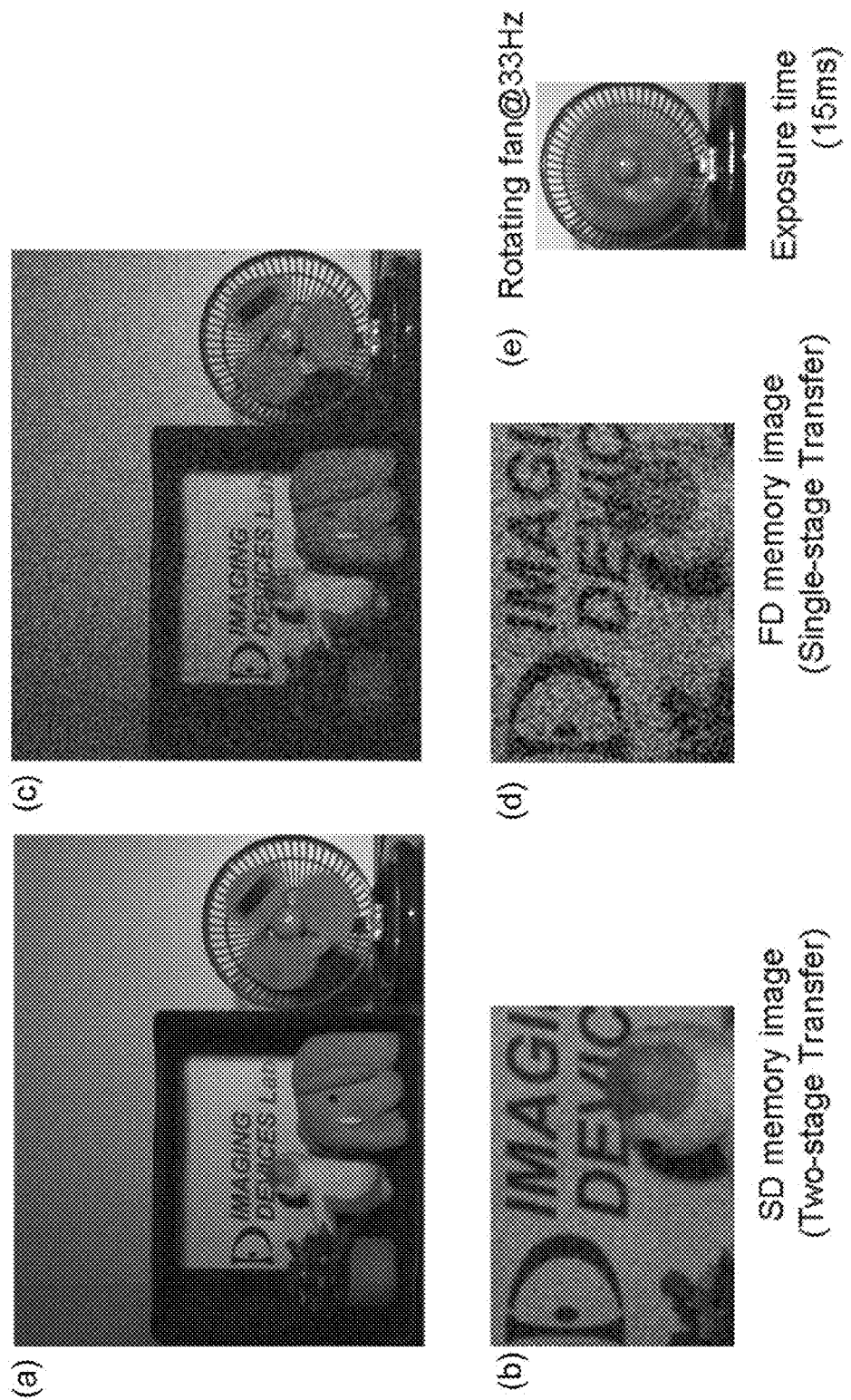
FIG. 9 is a diagram illustrating images according to SD and FD signals.

FIG. 9 is a diagram illustrating images according to SD and FD signals. Parts (a) and (b) in FIG. 9 represent images obtained by a two-stage transfer in the image sensor. The two-stage transfer utilizes a storage diode on a transfer path. Parts (c) and (d) in FIG. 9 represent images obtained by a single-stage transfer in the image sensor. The single-stage transfer directly transfers photocharges from a photodiode to a floating semiconductor region. When generating the images in parts (a) to (d) in FIG. 9, the analog and digital gains in the column circuits are 15× and 10×, respectively, while the shutter time is 1 ms. Part (e) in FIG. 9 illustrates an image of a fan rotating at 33 Hz captured at a shutter time of 15 ms. When the images in the parts (a) to (d) are compared with the image in the part (e), there is a difference in the images of rotating blades of the fan.

Functions provided by the solid-state image pickup device in accordance with this embodiment, e.g., wide dynamic range imaging with a global shutter and linear response, motion detection by a difference image, and ultrahigh-speed capture of two consecutive images and image stabilization, will now be explained.

(1) Wide Dynamic Range Imaging with a Global Shutter and Linear Response

The first accumulation period for accumulating the charge transferred through the first charge transfer path CTP1 is made longer than the second accumulation period for accumulating the charge transferred through the second charge transfer path CTP2. The signal processing unit 5 may include a signal synthesis unit which synthesizes a synthetic image signal from the first and second image signals S1, S2. The synthetic image signal has a dynamic range wider than that of each of the first and second image signals S1, S2. For example, the charge concerning the transfer path CTP1 including the storage diode SD can be allocated to a signal for a low-illuminance region, whereby exposure is performed for a long time. The charge concerning the other transfer path CTP2 can be allocated to a signal for a high-illuminance region, whereby exposure is performed for a short time. Using these two pixel signals can synthesize a linear image signal with a wide dynamic range. The respective charges of the transfer paths (CTP1 and CTP2) are generated at the same photo-sensitivity and converted into voltages by the same conversion gain. This yields an excellent linear response. Since they are subjected to photoelectric conversion by the same photodiode and charge-voltage conversion by the same floating diffusion layer and issued from the same pixel readout circuit, signals are obtained with the same photo-sensitivity, conversion gain, and voltage gain. A preferred CMOS image sensor in this embodiment could demonstrate a dynamic range of 92 dB while having a global shutter. It could implement a linearity of less than 1% even under high illuminance. This value represents a better linearity than the value of 10% known heretofore by the inventors. It could also demonstrate a high shutter efficiency of 99.7%.

The signal concerning the first accumulated charge is applied to the low-illuminance region, so as to generate the SD-held signal under long-time exposure, whereas the signal concerning the second accumulated charge is applied to the high-illuminance region, so as to generate the FD-held signal under short-time exposure. This enables wide dynamic range imaging utilizing an accumulation time ratio. The reset noise in the SD-held signal is canceled, which is suitable for expanding the dynamic range on the low illuminance side. The random noise is high in the FD-held signal, since the reset noise cannot be canceled therein. In the imaging in the high illuminance region, however, the shot noise is dominant over the random noise, so that the influence of the random noise over the image signals can be lowered. This combination can effectively widen the dynamic range. When the time interval between two shutter operations is concerned, multiple-exposure schemes known heretofore by the inventors have yielded a large difference in accumulation time between two exposures, whereby image distortions and the like are generated in the synthetic image because of the difference between the times of imaging. The dual shutter scheme in accordance with this embodiment, by contrast, yields only a short time difference on the order of several μs to several tens of μs, whereby image distortions in the synthetic image are so small as to be substantially negligible. Thus, a CMOS image sensor which can achieve a global shutter and a linear-response wide dynamic range imaging scheme is provided.

Figure 10:
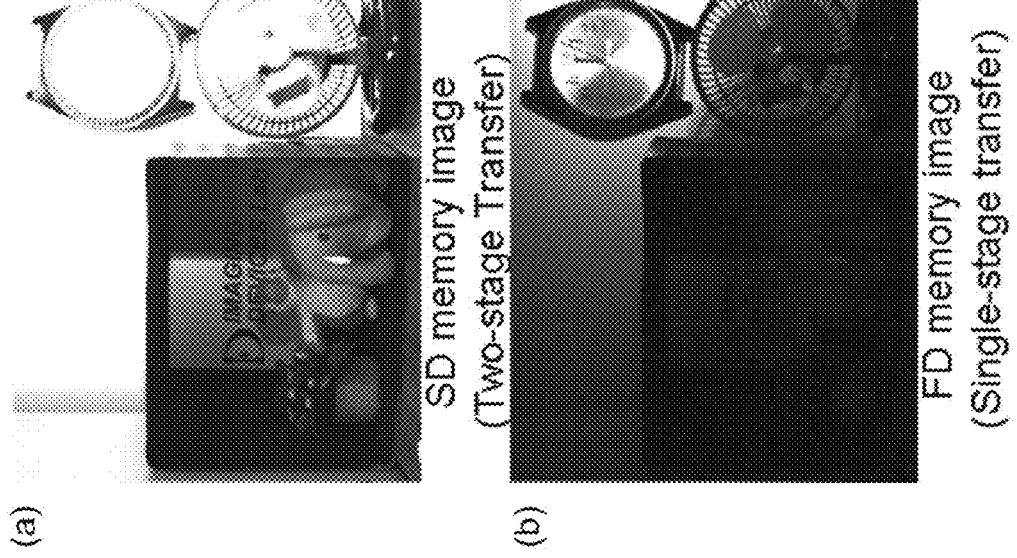
FIG. 10 is a diagram illustrating images obtained by wide dynamic range imaging with a global shutter and linear response.

FIG. 10 is a diagram illustrating images obtained by wide dynamic range imaging with a global shutter and linear response. Part (a) in FIG. 10 illustrates an image (SD image) from an SD signal generated by a two-stage transfer. When generating this image, the exposure time (the duration from the turnoff of the transistor TR(EP) to the turnoff of the shutter transistor TR(GR1)) is 1 ms. Part (b) in FIG. 10 illustrates an image (FD image) from an FD signal generated by a single-stage transfer. When generating this image, the exposure time is 0.167 ms. Part (c) in FIG. 10 illustrates an image synthesized from the SD and FD images.

(2) High Speed Imaging

In the same frame, the pixel array 3 can acquire the first and second image signals S1, S2. This can provide image signals consecutively captured at a plurality of times very close to each other. The time interval within the same frame may be on the order of several μs to several tens of μs. It can also provide an image signal which enables high-speed imaging by a plurality of captures at a plurality of times within the same frame.

(3) Image Stabilization by a Difference Image

This embodiment can compare one of the first and second image signals S1, S2 with the other and provide a comparison signal indicating the result of comparison between the first and second image signals S1, S2. Providing the signal processing unit with a comparator for generating the comparison result can yield a function concerning motion detection by a difference image. The pixel array 3 can acquire the first and second image signals S1, S2 in the same frame. While the image signals S1, S2 are acquired at respective times different from each other, the time interval therebetween can be made very short within the range of the performance of the device. Comparing the image signals S1, S2 representing the images close to each other can detect changes, differences, and the like between the images close to each other. This detection can be used for sensing in image stabilization, for example.

(4) Motion Detection by a Difference Image

In this embodiment, a signal corresponding to a difference between the pixel signals S1, S2 can be generated. Providing the signal processing unit with a difference generator therefor can yield a function for detecting the difference between the first and second pixel signals S1, S2. Since the difference between the image signals S1, S2 acquired at a plurality of times within the frame is generated, a difference image can be produced in high-speed imaging. Utilizing the difference image can provide a function such as motion detection, for example.

When the first accumulation period for generating the charge transferred from the photoelectric transducer 11a to the storage diode SD is made substantially equal to the second accumulation period for generating the charge transferred from the photoelectric transducer 11a to the floating semiconductor region FD, for example, motion detection by producing the difference image can be provided simply. The time difference between the images is set by adjusting the interval between the accumulation times concerning two shutters. When this value is made short, accurate motion detection can be provided for high-speed objects.

Figure 11:
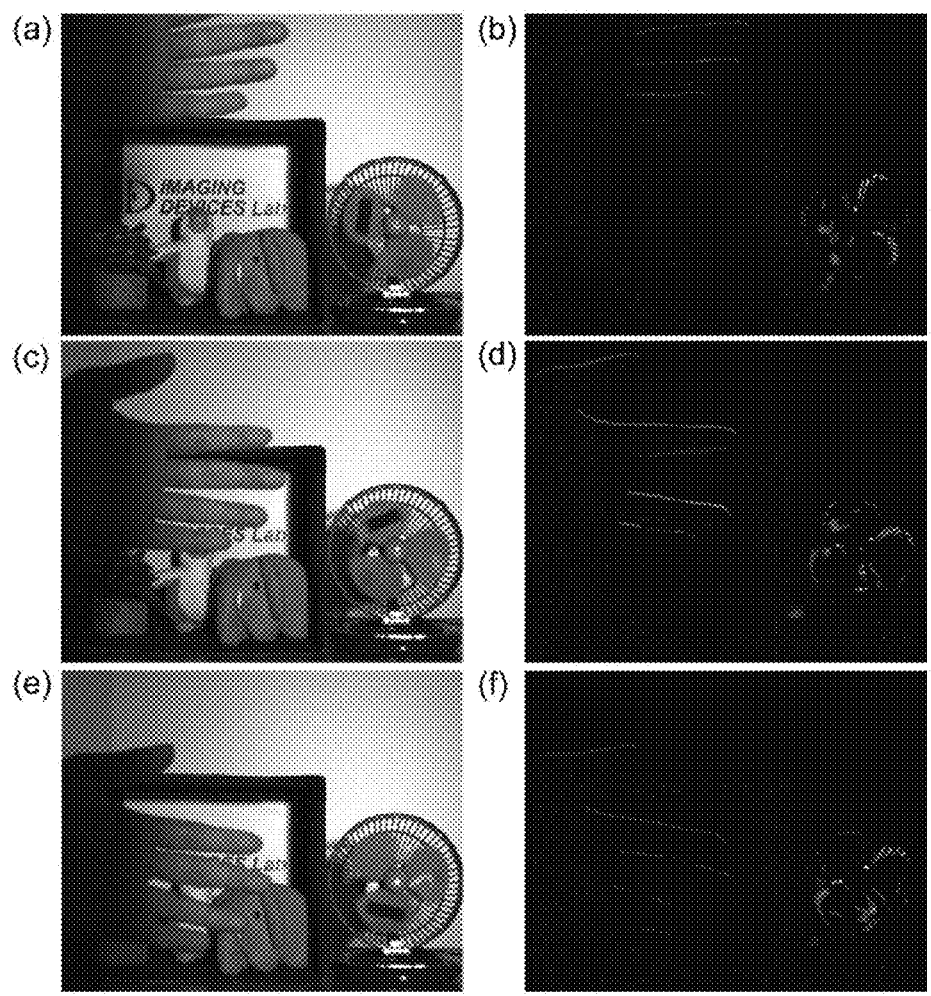
FIG. 11 is diagram illustrating an example of images for detecting a motion.

FIG. 11 is diagram illustrating an example of images for detecting a motion. Parts (a), (c), and (e) in FIG. 11 illustrate SD images, whereas parts (b), (d), and (f) in FIG. 11 illustrate difference images concerning the SD images. The difference images in the parts (b), (d), and (f) in FIG. 11 illustrate edges of moving objects within a target range at the time of capturing images in the parts (a), (c), and (e) in FIG. 11, respectively.

One of applications of generating a plurality of images within one frame lies in that it can provide two ultrahigh-speed imaging operations independent of the frame rate when the time difference between the images is minimized. The first and second accumulation periods may be set equal to each other or different from each other as necessary. Another of applications of generating a difference can be employed for analyzing the speed of an object moving at high speed. Since the time difference between two images can be set, the two images can be compared with each other by using the known time difference, so as to perform image stabilization.

These processing operations can be achieved as hardware processing using the signal processing unit 9, software processing, or their combination, for example.

Referring to FIG. 2 again, the pixel 11 includes the photoelectric transducer 11a for generating an electric signal from the light L received thereby; the floating semiconductor region FD for accumulating the charge from the photoelectric transducer 11a; the first charge transfer path CTP1 extending from the photoelectric transducer 11a to the floating semiconductor region FD; the second charge transfer path CTP2, different from the first charge transfer path CTP1, extending from the photoelectric transducer 11a to the floating semiconductor region FD; and the output unit AMP for providing a signal corresponding to the potential in the floating semiconductor region FD. The first charge transfer path CTP1 includes the first shutter switch TR(GS1) for controlling the charge transfer from the photoelectric transducer 11a, the first storage diode SD for accumulating the charge from the photoelectric transducer 11a, and the first transfer switch TR(TF1) for controlling the charge transfer from the first storage diode SD to the floating semiconductor region FD.

FIG. 12 is a diagram illustrating an example of high-precision dual shutters. Referring to part (a) in FIG. 12, the second charge transfer path CTP2 in this pixel 12a includes a second storage diode SD2 and a second transfer switch TR(TF2). In the following explanation, the first storage diode will be referred to as "SD1." The second storage diode SD2 accumulates the charge from the photoelectric transducer 11a, while the second transfer switch TR(TF2) controls the charge transfer from the second storage diode SD2 to the floating semiconductor region FD. For example, the second shutter switch TR(GS2) is connected between the photoelectric transducer 11a and one end of the second storage diode SD2, while the second transfer switch TR(TF2) is connected between the floating semiconductor region FD and one end of the second storage diode SD2. While multiplexed shutter operations are provided, two low-noise pixel signals are obtained by using the storage diodes SD1, SD2. Therefore, accurate difference images and two ultrahigh-speed images can be acquired even under low illuminance, for example.

A plurality of global shutter functions can be provided by utilizing a plurality of storage diodes SD1, SD2. This structure can cancel the reset noise when generating individual image signals. Therefore, the pixel 12a can provide images of low-noise global shutters and highly accurately generate a difference between images, between two images with the same accumulation time in particular.

Employing pipeline processing enables double-speed imaging in high-speed imaging. Referring to part (b) in FIG. 12, pipeline processing for double-speed imaging is illustrated. Temporarily holding the charge in each of the two charge transfer paths CTP1, CTP2 can be performed independently of the floating semiconductor region FD. Hence, the transfer/hold from the photodiode PD to the storage diode SD1 (SD2) and the hold/transfer from the storage diode SD2 (SD1) to the floating semiconductor region FD can be parallelized. When sorting charges into a plurality of transfer paths and reading pixel signals indicating charge amounts from each row by using the readout circuit in a column, while a column line is used for reading a signal concerning one transfer path, a signal concerning the other transfer path is transferred from the photodiode to the storage diode. Hence, after completely reading the signal concerning one transfer path, the column line can be used for reading the signal concerning the other transfer path. Therefore, double-speed readout is possible without increasing the number of signal lines longitudinally extending in the column direction.

Figure 13:
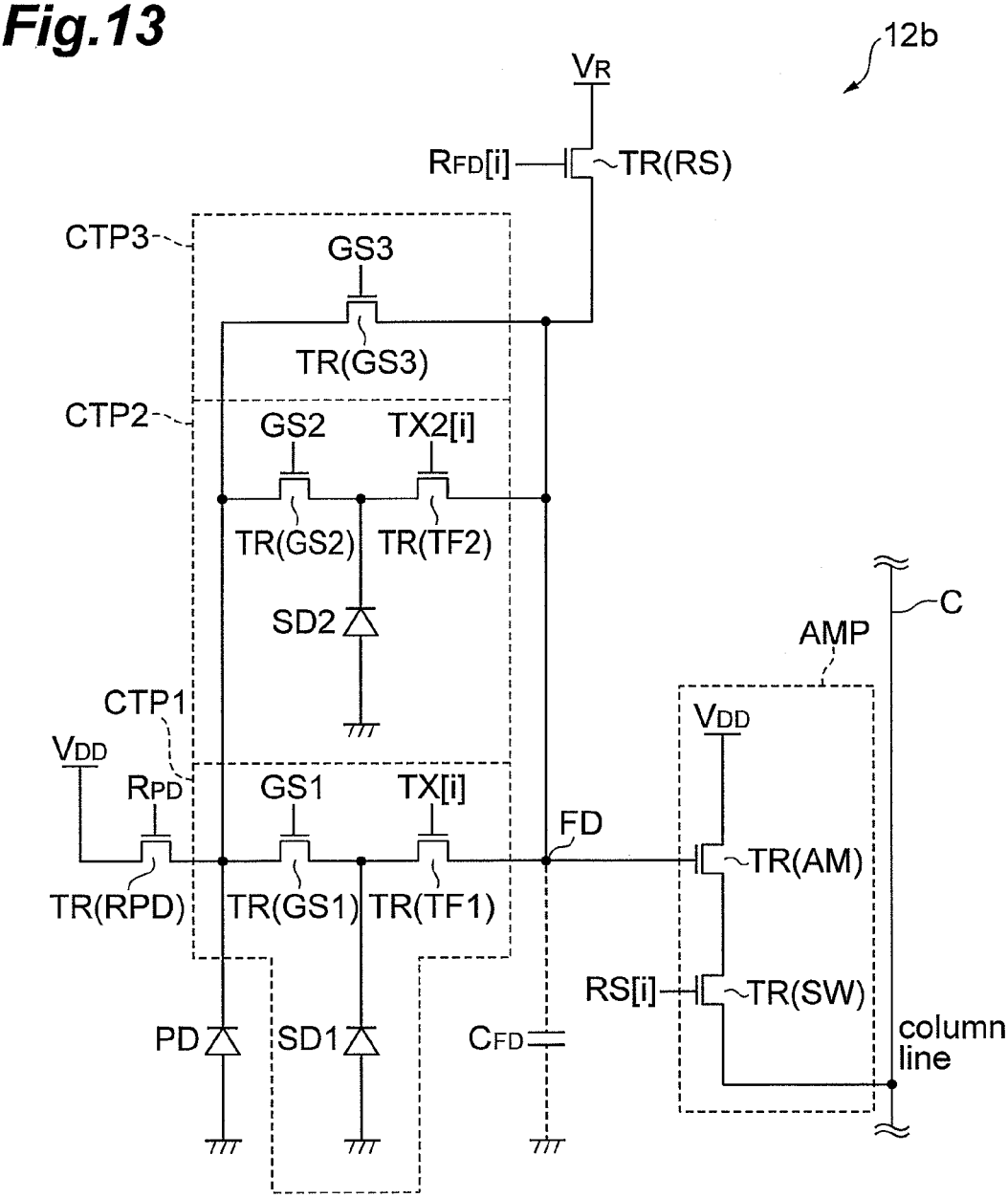
FIG. 13 is a diagram illustrating an example of pixels having a triple shutter function.

FIG. 13 is a diagram illustrating an example of pixels having a triple shutter function. This pixel 12b includes a third charge transfer path CTP3 in addition to the first and second charge transfer paths CTP1, CTP2. The third charge transfer path CTP3 includes a structure similar to that of the second charge transfer path CTP2 in the pixel 11. The third charge transfer path CTP3 includes a shutter switch TR(GS3) for transferring a charge from the photoelectric transducer 11a to the floating semiconductor region FD. In the third charge transfer path CTP3, a shutter transistor for the switch TR(GS3) is connected between the photoelectric transducer 11a and the floating semiconductor region FD, for example.

On an equivalent circuit, a gate TR(GS3) which can directly transfer charges to the floating semiconductor region FD is added to a pixel for a high-precision dual shutter. Therefore, three global shutter images can be acquired. Setting respective ratios for three accumulation times can further enhance the dynamic range.

Figure 14:
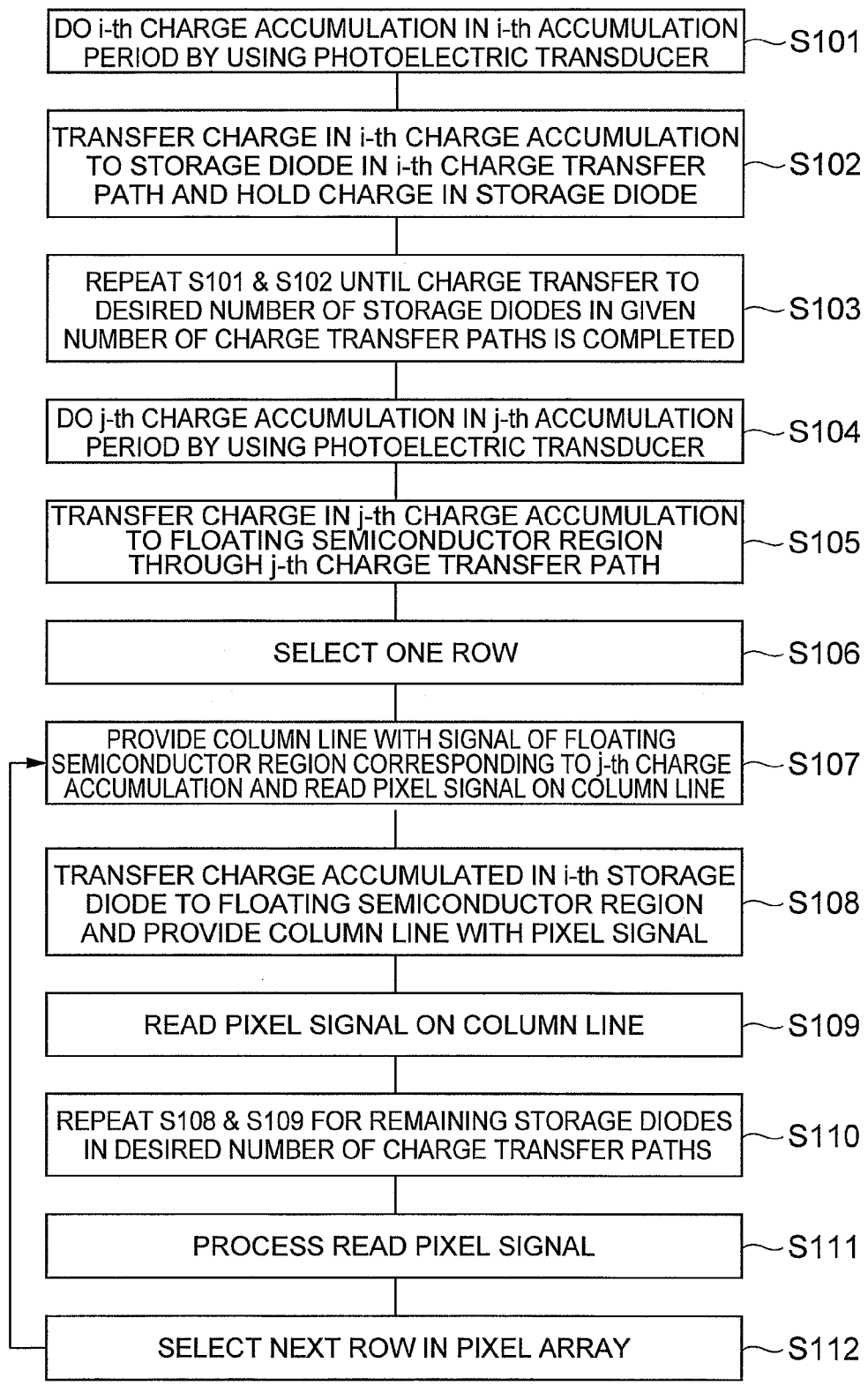
FIG. 14 is a chart illustrating main steps in a method of reading pixel signals from pixels.

FIG. 14 is a chart illustrating main steps in a method of reading pixel signals from a plurality of pixels within a pixel array. Since the pixels within the pixel array are concerned with an all-pixel simultaneous shutter, the charge transfers by the control signals GS1, GS2, $R_{PD}$ are performed for all the pixels at the same time. Similarly, the charge accumulations by the photodiodes are performed for all the pixels at the same time. The charge transfers by the control signals GS1, GS2 are performed during a period in which no pixel is selected, thereafter a pixel begins to be selected, and the reading of the signals is started. The following explanation will relate to pixels within a given row of the pixel array 3. At step S101, the reading method performs the i-th charge accumulation in the i-th accumulation period within a frame period by using the photoelectric transducer 11a in each of the pixels 11 (12a, 12b) in the pixel array 3 (where i is a natural number, for example, which is 1 at the first readout). At step S102, the charge in this charge accumulation is temporarily accumulated in a storage diode SDi within the i-th charge transfer path in the pixel 11 in order to transfer it to the floating semiconductor region FD through the i-th charge transfer path.

When necessary, i.e., when there is another charge transfer path, the (i+1)-th charge accumulation is performed in the (i+1)-th charge accumulation period within the same frame period by using the photoelectric transducer 11a at step S103, and then the charge in this charge accumulation is temporarily accumulated in the storage diode SD(i+1) within the (i+1)-th charge transfer path in the pixel 11 in order to transfer it to the floating semiconductor region FD through the (i+1)-th charge transfer path.

When the above is unnecessary, step 104 can be performed after the step S102. For example, there is no repetition when the pixel includes two transfer paths, whereas a repetition is performed when the pixel includes three transfer paths. While these procedures can be repeated when necessary, no charge transfer is repeated in this embodiment.

At step S104, the j-th charge accumulation is performed in the j-th accumulation period within the same frame period by using the photoelectric transducer 11a in each of the pixels 11 (j=2 in this embodiment). Subsequently, at step S105, the charge in the j-th charge accumulation is transferred to the floating semiconductor region FD in the pixel 11 through the j-th charge transfer path thereof. At step S106, a given row in the pixel array 3 is selected. The column line C is provided with the pixel signal S1 corresponding to the amount of transferred charge in the floating semiconductor region FD. At step 107, a reading operation is performed with respect to the selected row, so as to read the pixel signal S1 on the column line.

At step S108, the charge temporarily stored in the storage diode SDi is transferred to the floating semiconductor region FD, while the column line is provided with the pixel signal S2 corresponding to the amount of thus transferred charge. At step S109, the pixel signal S2 on the column line is read. At step S111, the pixel signals S1, S2 are processed when the number of charge transfer paths is 2. At step S112, a next row of the pixel array is selected. The reading operation is repeated by the desirable number of pixel rows.

In the reading method using two transfer paths, the pixel 11 performs the first and second charge accumulations in the first and second accumulation periods, respectively, within one frame. The charge in the first charge accumulation is temporarily accumulated in the storage diode SD1 before being transferred to the floating semiconductor region FD. During this accumulation period, the charge in the second charge accumulation is transferred to the floating semiconductor region FD through the second charge transfer path CTP2, while the column line is provided with the pixel signal S1 representing the potential of the floating semiconductor region FD corresponding to the amount of thus transferred charge. Thereafter, the charge temporarily accumulated in the storage diode SD1 is transferred to the floating semiconductor region FD, while the column line is provided with the pixel signal S2 representing the potential of the floating semiconductor region FD corresponding to the amount of thus transferred charge. In these transfers, the charge from the photoelectric transducer 11a is temporarily accumulated in the storage diode SD1 during the transfer using one of the transfer paths. The temporary accumulation allows the other transfer path to transfer the charge. Hence, the first and second charge accumulations are kept from interfering with each other in terms of transferring charges in the first and second accumulation periods and thus enable multiplexed global shutter operations in the pixel array 3. Also, the pixel signals S1, S2 provided on the column line in a time-division manner can be read and processed for higher functions.

When the number of charge transfer paths is 3 or more, the accumulation in the storage diode is repeated. At step S108 after the step S107, the charge held in the i-th storage diode is transferred to the floating semiconductor region FD, while the column line C is provided with a pixel signal S3. At step S109, the pixel signal S3 on the column line C is read. At step S110, the process of transferring the unread charge of the storage diode to the floating semiconductor region FD while providing the column line C with the pixel signal corresponding to the charge and the process of reading the pixel signal on the column line are repeated at the required times.

When using the pixel 12a including a high-precision dual shutter, for example, the first and second transfer paths are provided with respective storage diodes. In this embodiment, j=2. After performing the second charge accumulation during the second accumulation period, the charge in the first charge accumulation is transferred to the floating semiconductor region FD through the first charge transfer path in the pixel 12a, while the column line is provided with the pixel signal S1 corresponding to the amount of transferred charge in the floating semiconductor region FD. Thereafter, at the step S110, the charge in the second charge accumulation is transferred to the floating semiconductor region FD through the second charge transfer path in the pixel 12a, while the column line is provided with the pixel signal S2 corresponding to the amount of transferred charge in the floating semiconductor region FD. In the case of the high-precision dual shutter, the pixel is read after accumulating the charges in the storage diodes SD1, SD2. No charge is directly transferred from the photodiode PD to the floating semiconductor region FD. Since the transfer paths use the respective storage diodes, two low-noise signals having canceled the reset noise (kTC noise) are obtained.

When using the pixel 12b including a triple shutter, for example, the first and second transfer paths are provided with respective storage diodes. At the step S103, the second charge accumulation is performed during the second accumulation period within the frame period by using the photoelectric transducer 11a, and the charge in the second charge accumulation is temporarily accumulated in the second storage diode SD2 within the second charge transfer path in order to transfer it to the floating semiconductor region FD through the second charge transfer path CTP2 in the pixel 12b. At the step S110, the charge temporarily accumulated in the second storage diode SD2 is transferred to the floating semiconductor region FD while the column line C is provided with the pixel signal corresponding to the amount of transferred charge in the floating semiconductor region FD, and the pixel signal on the column line C is read. At the step S111, thus read three pixel signals are processed. These steps enable the third charge accumulation using the third storage diode, thereby providing a triple shutter.

Though the principle of the present invention has been illustrated and explained in a preferred embodiment, the present invention is not limited to specific structures disclosed in this embodiment.

In the above-mentioned aspect of the invention, the pixel may include a reset switch for resetting the floating semiconductor region. The control circuit generates a reset signal for controlling the reset switch. The first pixel signal may include a first signal level corresponding to the first transfer charge and a first reset level corresponding to a potential of the floating semiconductor region reset by the reset switch. The second pixel signal may include a second signal level corresponding to the second transfer charge and a second reset level corresponding to a potential of the floating semiconductor region reset by the reset switch. The readout circuit may include first and second correlated double sampling circuits for sampling the first and second pixel signals, respectively.

According to this aspect, the first and second pixel signals are sampled by using the first and second correlated double sampling circuits, respectively, whereby the fixed pattern noise of pixels can be eliminated.

In the above-mentioned aspect of the invention, the first accumulation period for accumulating the charge transferred through the first charge transfer path is longer than the second accumulation period for accumulating the charge transferred through the second charge transfer path. The signal processing unit may include a signal synthesis unit which synthesizes a synthetic image signal from the first and second image signals. The synthetic image signal has a dynamic range wider than that of each of the first and second image signals.

For example, the accumulated charge concerning the transfer path including the storage diode can be allocated to a signal for a low-illuminance region, whereby exposure is performed for a long time for the charge accumulation. The accumulated charge concerning another transfer path can be allocated to a signal for a high-illuminance region, whereby exposure is performed for a short time for the charge accumulation. Using these two pixel signals can synthesize a linear image signal with a wide dynamic range.

In the above-mentioned aspect of the invention, the signal processing unit may include a comparator for comparing one of the first and second image signals with the other and providing a comparison signal representing a comparison result of the first and second image signals.

According to the above-mentioned invention, the pixel array can acquire the first and second image signals in the same frame. While the image signals are acquired at respective times different from each other, the time interval therebetween can be made very short within the range of the performance of the device. Comparing the image signals representing the images close to each other can detect changes, differences, and the like between the images close to each other. This detection can be used for sensing in image stabilization, for example.

When performing no comparison, the above-mentioned invention can provide image signals consecutively captured at a plurality of times very close to each other. When performing no comparison, the above-mentioned invention can also provide an image signal which enables high-speed imaging by a plurality of captures at a plurality of times close to each other.

In the above-mentioned aspect of the invention, the signal processing unit may include a difference generator which generates a signal representing a difference between the first and second pixel signals. The above-mentioned invention generates a difference between the image signals acquired at a plurality of times close to each other and thus can produce a difference image. Using the difference image can provide a function such as motion detection, for example.

In the above-mentioned aspect of the invention, the difference image can be produced easily when the first accumulation period for generating the charge transferred from the photoelectric transducer to the first storage diode is made substantially equal to the second accumulation period for generating the charge transferred from the photoelectric transducer to the floating semiconductor region.

In the above-mentioned aspect of the invention, the other of the first and second charge transfer paths may include a second storage diode for accumulating the charge from the photoelectric transducer and a second transfer switch for controlling a transfer of the charge from the second storage diode to the floating semiconductor region in response to a fourth control signal. The first shutter switch is connected between the photoelectric transducer and one end of the first storage diode, while the first transfer switch is connected between the one end of the first storage diode and the floating semiconductor region. The second transfer switch is connected between the floating semiconductor region and one end of the second storage diode, while the second shutter switch is connected between the photoelectric transducer and the one end of the second storage diode.

In the above-mentioned invention, the first and second shutter switches control the charge transfers from the photoelectric transducer to the first and second storage diodes, respectively. As a result of these controls, the respective transfer charges are temporarily accumulated in the first and second storage diodes. In the solid-state image pickup device, these storage diodes can provide a pn diode having an embedded structure. A high accumulation performance is obtained. This higher performance can provide a high-precision multiplexed shutter (e.g., dual shutter) for charge transfers.

In the above-mentioned aspect of the invention, the pixel may further comprise a third charge transfer path, different from the first and second charge transfer paths, extending from the photoelectric transducer to the floating semiconductor region. The third charge transfer path includes a third shutter switch for controlling a transfer of the charge from the photoelectric transducer in response to a fifth control signal, a third storage diode for accumulating the charge from the photoelectric transducer, and a third transfer switch for controlling a transfer of the charge from the third storage diode to the floating semiconductor region in response to a sixth control signal; the signal processing circuit reads a third pixel signal from the pixel array; and the third pixel signal corresponds to the charge transferred to the floating semiconductor region through the third charge transfer path. By providing the third charge transfer path and the third storage diode therein, the above-mentioned invention can yield a triple shutter.

In an example of the pixel circuit, the third shutter switch is connected between the photoelectric transducer and one end of the third storage diode, while the third transfer switch is connected between one end of the third storage diode and the floating semiconductor region.

INDUSTRIAL APPLICABILITY

The present invention is used for a solid-state image pickup device, a method of reading a pixel signal, and a pixel and can provide a solid-state image pickup device which enables multiplexed global shutter operations, a method of reading a pixel signal from a pixel array including a plurality of pixels arranged in an array, or a pixel which enables multiplexed shutter operations.

REFERENCE SIGNS LIST

1 . . . solid-state image pickup device; 3 . . . pixel array; 11, 12a, 12b . . . pixel; 11a . . . photoelectric transducer; 11b . . . pixel circuit; S1, S2, S(pixel) . . . pixel signal; C . . . column line; 5 . . . column signal processing unit; 15 . . . column signal processing circuit; 9 . . . signal processing unit; CTP1, CTP2, CTP3 . . . charge transfer path; SD, SD1, SD2 . . . storage diode

What is claimed is:

1. A solid-state image pickup device comprising:
a pixel array including a plurality of pixels arranged in an array;
a control circuit for generating first, second, and third control signals for controlling the pixel;
a readout circuit for reading the first and second pixel signals from the pixel array in one frame; and
a signal processing unit for processing signals from the readout circuit;
wherein each pixel includes:
a photoelectric transducer for generating an electric signal from light received thereby;
a floating semiconductor region for accumulating a charge from the photoelectric transducer;
a first charge transfer path extending from the photoelectric transducer to the floating semiconductor region;
a second charge transfer path extending from the photoelectric transducer to the floating semiconductor region; and
an output unit for providing a signal corresponding to a potential in the floating semiconductor region;
wherein one of the first and second charge transfer paths includes a first shutter switch for controlling a transfer of the charge from the photoelectric transducer in response to the first control signal, a first storage diode for accumulating the charge from the photoelectric transducer, and a first transfer switch for controlling a transfer of the charge from the first storage diode to the floating semiconductor region in response to the second control signal;
wherein the other of the first and second charge transfer paths includes a second shutter switch for controlling a transfer of the charge from the photoelectric transducer to the floating semiconductor region through no charge storage unit in response to the third control signal;
wherein the first pixel signal corresponds to a first transfer charge transferred to the floating semiconductor region through the first charge transfer path;
wherein the second pixel signal corresponds to a second transfer charge transferred to the floating semiconductor region through the second charge transfer path;
wherein a first accumulation period for accumulating the charge transferred through the one charge transfer path is longer than a second accumulation period for accumulating the charge transferred through the other charge transfer path;
wherein the signal processing unit includes a signal synthesis unit for synthesizing a synthetic image signal from the first and second pixel signals;
wherein the synthetic image signal has a dynamic range wider than that of each of the first and second image signals;
wherein the pixel includes a reset switch for resetting the floating semiconductor region;
wherein the control circuit generates a reset signal for controlling the reset switch;
wherein the first pixel signal includes a first signal level corresponding to the first transfer charge and a first reset level corresponding to a potential of the floating semiconductor region reset by the reset switch;
wherein the second pixel signal includes a second signal level corresponding to the second transfer charge and a second reset level corresponding to a potential of the floating semiconductor region reset by the reset switch; and
wherein the readout circuit includes first and second correlated double sampling circuits for sampling the first and second pixel signals, respectively.

2. A solid-state image pickup device comprising: a pixel array including a plurality of pixels arranged in an array:
a control circuit for generating first, second, and third control signals for controlling the a readout circuit for reading the first and second pixel signals from the pixel array in one frame; and
a signal processing unit for processing signals from the readout circuit; wherein each pixel includes: a photoelectric transducer for generating an electric signal from light received thereby;
a floating semiconductor region for accumulating a charge from the photoelectric transducer;
a first charge transfer path extending from the photoelectric transducer to the floating semiconductor region;

a second charge transfer path extending from the photoelectric transducer to the floating semiconductor region; and an output unit for providing a signal corresponding to a potential in the floating semiconductor region;

wherein one of the first and second charge transfer paths includes a first shutter switch for controlling a transfer of the charge from the photoelectric transducer in response to the first control signal, a first storage diode for accumulating the charge from the photoelectric transducer, and a first transfer switch for controlling a transfer of the charge from the first storage diode to the floating semiconductor region in response to the second control signal;

wherein the other of the first and second charge transfer paths includes a second shutter switch for controlling a transfer of the charge from the photoelectric transducer to the floating semiconductor region through no charge storage unit in response to the third control signal;

wherein the first pixel signal corresponds to a first transfer charge transferred to the floating semiconductor region through the first charge transfer path;

wherein the second pixel signal corresponds to a second transfer charge transferred to the floating semiconductor region through the second charge transfer path;

wherein a first accumulation period for accumulating the charge transferred through the one charge transfer path is longer than a second accumulation period for accumulating the charge transferred through the other charge transfer path;

wherein the signal processing unit includes a signal synthesis unit for synthesizing a synthetic image signal from the first and second pixel signals wherein the synthetic image signal has a dynamic range wider than that of each of the first and second image signals;

wherein the pixel further comprises a third charge transfer path extending from the photoelectric transducer to the floating semiconductor region;

wherein the third charge transfer path includes a third shutter switch for controlling a transfer of the charge from the photoelectric transducer in response to a fifth control signal, a third storage diode for accumulating the charge from the photoelectric transducer, and a third transfer switch for controlling a transfer of the charge from the third storage diode to the floating semiconductor region in response to a sixth control signal;

wherein the signal processing unit reads a third pixel signal from the pixel array; and wherein the third pixel signal corresponds to the charge transferred to the floating semiconductor region through the third charge transfer path.

* * * * *